US012748975B2

(12) United States Patent
Han et al.

(10) Patent No.: US 12,748,975 B2
(45) Date of Patent: Sep. 29, 2026

(54) DATA FEATURE EXTRACTION METHOD AND RELATED APPARATUS

(71) Applicant: HUAWEI TECHNOLOGIES CO., LTD., Shenzhen (CN)

(72) Inventors: Kai Han, Beijing (CN); Yunhe Wang, Beijing (CN); Chunjing Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 944 days.

(21) Appl. No.: 18/148,304

(22) Filed: Dec. 29, 2022

(65) Prior Publication Data

US 2023/0143985 A1 May 11, 2023

Related U.S. Application Data

(63) Continuation of application No. PCT/CN2021/092073, filed on May 7, 2021.

(30) Foreign Application Priority Data

Jun. 30, 2020 (CN) ........................ 202010614694.3

(51) Int. Cl.
*G06N 3/084* (2023.01)
*G06F 7/544* (2006.01)
(Continued)

(52) U.S. Cl.
CPC ........... *G06N 3/084* (2013.01); *G06N 3/0464* (2023.01); *B01J 2219/00216* (2013.01);
(Continued)

(58) Field of Classification Search
CPC ...... G06N 3/084; G06N 3/0464; G06N 3/045; G06N 3/08; G06V 10/40; G06V 10/764;
(Continued)

(56) References Cited

U.S. PATENT DOCUMENTS

2020/0097826 A1* 3/2020 Du ........................... G06N 3/04

FOREIGN PATENT DOCUMENTS

| | | |
|---|---|---|
| CN | 110135563 A | 8/2019 |
| CN | 110874627 A | 3/2020 |
| CN | 111914996 A | 11/2020 |

OTHER PUBLICATIONS

Chen et al., "AdderNet: Do We Really Need Multiplications in Deep Learning?," Arxiv.org, Cornell University Library, 201 Olin Library Cornell University, Ithaca, NY 14853, XP081570359, total 10 pages (Dec. 31, 2019).

(Continued)

*Primary Examiner* — Quoc A Tran
(74) *Attorney, Agent, or Firm* — Leydig, Voit & Mayer, Ltd.

(57) ABSTRACT

A data feature extraction method and apparatus in the field of artificial intelligence are provided. An addition convolution operation is performed to extract a target feature in quantized data based on quantized feature extraction parameters, that is, to calculate a sum of absolute values of differences between the quantized feature extraction parameters and the quantized data, to obtain the target feature based on the sum. In addition, feature extraction parameters and data are quantized by using a same quantization parameter. According to this application, a storage resource is saved, a computing resource is saved, thereby reducing a limitation on an application of artificial intelligence to a resource-limited device. Further, when the extracted feature data is dequantized, the feature data may be dequantized based on the quantization parameters.

17 Claims, 10 Drawing Sheets

(51) Int. Cl.

| | |
|---|---|
| ***G06F 18/21*** | (2023.01) |
| ***G06N 3/045*** | (2023.01) |
| ***G06N 3/0464*** | (2023.01) |
| ***G06N 3/08*** | (2023.01) |
| ***G06V 10/40*** | (2022.01) |
| ***G06V 10/764*** | (2022.01) |
| ***G06V 10/77*** | (2022.01) |
| ***G06V 10/774*** | (2022.01) |
| ***G06V 10/82*** | (2022.01) |

(52) U.S. Cl.

CPC .......... *G06F 7/5443* (2013.01); *G06F 18/217* (2023.01); *G06N 3/045* (2023.01); *G06N 3/08* (2013.01); *G06V 10/40* (2022.01); *G06V 10/764* (2022.01); *G06V 10/7715* (2022.01); *G06V 10/774* (2022.01); *G06V 10/82* (2022.01)

(58) Field of Classification Search

CPC .... G06V 10/82; G06V 10/45; G06V 10/7715; G06F 7/5443; G06F 18/217; B01J 2219/00216

See application file for complete search history.

(56) References Cited

OTHER PUBLICATIONS

Manjunatha et al., "FPGA Implementation of Sum of Absolute Difference (SAD) for Video Applications," ARPN Journal of Engineering and Applied Sciences (Islamabad), vol. 12, No. 24, XP093098939, pp. 7192-7197 (Dec. 31, 2017).

* cited by examiner

Weight matrix in a 32-bit floating-point numerical format

| | | | |
|---|---|---|---|
| 2.09 | −0.98 | 1.48 | 0.09 |
| 0.05 | −0.14 | −1.08 | 2.12 |
| −0.91 | 1.92 | 0 | −1.03 |
| 1.87 | 0 | 1.53 | 1.49 |

Quantize →

Weight matrix in a 2-bit integer numerical format

| | | | |
|---|---|---|---|
| 1 | 0 | 1 | 0 |
| 0 | 0 | −1 | 1 |
| 0 | 1 | 0 | 0 |
| 1 | 0 | 1 | 1 |

FIG. 2

DATA FEATURE EXTRACTION METHOD AND RELATED APPARATUS

CROSS-REFERENCE TO RELATED APPLICATIONS

This application is a continuation of International Application No. PCT/CN2021/092073, filed on May 7, 2021, which claims priority to Chinese Patent Application No. 202010614694.3, filed on Jun. 30, 2020. The disclosures of the aforementioned applications are hereby incorporated by reference in their entireties.

TECHNICAL FIELD

Embodiments of this application relate to data computation technologies in the field of artificial intelligence, and more specifically, to a data feature extraction method and a related apparatus.

BACKGROUND

Artificial intelligence (AI) refers to a theory, method, technology, and application system that are used to simulate, extend, and expand human intelligence by using a digital computer or a machine controlled by a digital computer, to perceive an environment, obtain knowledge, and obtain an optimal result by using the knowledge. In other words, artificial intelligence is a branch of computer science and attempts to understand essence of intelligence and produce a new intelligent machine that can react in a similar manner to human intelligence. Artificial intelligence is to research design principles and implementation methods of various intelligent machines, so that the machines have perceptive, reasoning, and decision-making functions. Research in the field of artificial intelligence includes robotics, natural language processing, computer vision, decision-making and reasoning, man-machine interaction, recommendation and search, AI basic theories, and the like.

As an important branch of artificial intelligence, a neural network (NN) is a network structure that imitates a behavior feature of an animal neural network to perform information processing. A structure of the neural network includes a large quantity of nodes (or neurons) connected to each other, and information is processed by learning and training input information based on a specific operation model. One neural network includes an input layer, a hidden layer, and an output layer. The input layer is responsible for receiving an input signal, the output layer is responsible for outputting a computation result of the neural network, and the hidden layer is responsible for computation processes such as learning and training and is a memory unit of the network. A memory function of the hidden layer is represented by a weight matrix. Usually, each neuron corresponds to one weight parameter.

A convolutional neural network (CNN) is a multi-layer neural network, each layer includes a plurality of two-dimensional planes, each plane includes a plurality of independent neurons, the plurality of neurons of each plane share a weight, and a quantity of parameters of the neural network can be reduced through weight sharing. Currently, in the convolutional neural network, a convolution operation performed by a processor is usually that convolution between an input signal and a weight is converted into a matrix multiplication operation between a signal matrix and a weight matrix, to extract feature information of the input signal. In a specific matrix multiplication operation, block processing is performed on the signal matrix and the weight matrix to obtain a plurality of fractional signal matrices and a plurality of fractional weight matrices, and then a matrix multiply-accumulate operation is performed on the plurality of fractional signal matrices and the plurality of fractional weight matrices.

As performance of a neural network is enhanced, there are more weight parameters of the neural network, and the neural network has an increasingly high requirement and consumption on storage, computation, and the like when running. This is not conducive to applying neural network-based artificial intelligence to a resource-limited hardware terminal device.

It is found through research that the neural network has good robustness. Therefore, after a weight parameter of a large-scale neural network is quantized and precision of the weight parameter is reduced, the neural network can still maintain good performance. Therefore, a person skilled in the art proposes that if a trained neural network needs to be applied to a resource-limited terminal device, a weight parameter of the neural network may be quantized, to implement model compression on the neural network. In this way, when a compressed neural network is applied to the terminal device, storage consumption of the weight parameter and computation consumption of a feature extraction operation performed on an input signal based on the neural network may be reduced. When the terminal device performs feature extraction on the input signal based on the compressed neural network, the weight parameter of the neural network may be dequantized to ensure precision of an extracted feature.

However, it is further found through research that when multiplication convolution is performed on input information based on the quantized weight parameter of the neural network, a large quantity of hardware circuit resources are required, computational complexity is high, and energy consumption is still large. That is, a large quantity of computing resources required for performing multiplication convolution on the input information based on the quantized weight parameter of the neural network limit an application of artificial intelligence to a computing resource-limited device.

Therefore, how to reduce computing resources required for performing feature extraction on input information based on a quantized neural network is a technical problem to be resolved urgently.

SUMMARY

This application provides a data feature extraction method and a related apparatus, to reduce computing resources required for performing feature extraction on input information based on a quantized neural network. To be specific, a storage resource for storing a related parameter of the neural network is saved, and further, a computing resource required for performing feature extraction based on the related parameter of the neural network can be saved, thereby reducing a limitation on an application of neural network-based artificial intelligence to a resource-limited device.

According to a first aspect, this application provides a data feature extraction method. The method includes: reading first feature extraction parameters from a target memory, where the first feature extraction parameters include parameters obtained by performing first quantization processing on network parameters that are in a target neural network and that are used to extract a target feature; determining second feature extraction parameters based on the first feature extraction parameters, where the second feature extraction parameters include M*N parameters, and M and N are positive integers; reading first to-be-extracted feature data from the target memory, where the first to-be-extracted feature data is data obtained by performing second quantization processing on initial to-be-extracted feature data; determining second to-be-extracted feature data based on the first to-be-extracted feature data, where the second to-be-extracted feature data includes M*N pieces of data, and the M*N pieces of data are in a one-to-one correspondence with the M*N parameters; and performing an addition convolution operation on the second feature extraction parameters and the second to-be-extracted feature data by using a target processor, to obtain first feature data, where the addition convolution operation includes: computing an absolute value of a difference between each of the M*N parameters and corresponding data to obtain M*N absolute values; and computing a sum of the M*N absolute values.

A use of the first feature extraction parameters is similar to a use of a parameter in a convolution kernel in the conventional technology. The initial to-be-extracted feature data may be data processed by another network layer of the neural network, for example, may be data obtained by performing pooling or feature extraction on image data, textual data, or voice data. A manner of obtaining the initial to-be-extracted feature data is similar to a manner of obtaining corresponding to-be-convoluted data through a convolution window in the conventional technology.

In the method in this application, because the target memory stores the quantized first feature extraction parameters and the quantized first to-be-extracted feature data, a storage resource can be saved, that is, storage consumption can be reduced. In addition, in the method of this application, a multiplication operation is no longer included when feature extraction is performed on the quantized second to-be-extracted feature data based on the quantized first feature extraction parameters. Therefore, computational complexity can be reduced, that is, computing resource consumption can be reduced, thereby facilitating an application of an artificial intelligence technology using the neural network to a resource-limited device.

With reference to the first aspect, in a first possible implementation, a quantization parameter used for the second quantization processing is a first quantization parameter, and the first quantization parameter is a quantization parameter used for performing the first quantization processing on the network parameters. In other words, the network parameters and the initial to-be-extracted feature data are quantized by using a same quantization parameter, that is, the first quantization parameter is shared when the network parameters and the initial to-be-extracted feature data are quantized.

The determining second feature extraction parameters based on the first feature extraction parameters includes: determining the first feature extraction parameters as the second feature extraction parameters; and the determining second to-be-extracted feature data based on the first to-be-extracted feature data includes: determining the first to-be-extracted feature data as the second to-be-extracted feature data. That is, the addition convolution operation is performed on the second to-be-extracted feature data based on the first feature extraction parameters by using the target processor.

In addition, the method further includes: performing dequantization processing on the first feature data based on the first quantization parameter to obtain second feature data.

In this implementation, the quantized first feature extraction parameters are directly used to perform the addition convolution operation on the quantized first to-be-extracted feature data, to extract the first feature data corresponding to a target feature included in the first to-be-extracted feature data. Then, the first feature data is dequantized by using the shared first quantization parameter to obtain the second feature data. This can improve precision of extracted feature data.

In addition, in this implementation, dequantization is performed only once. This can further reduce computational complexity and lower a computing resource requirement, thereby further reducing a limitation on an application of neural network-based artificial intelligence to a resource-limited device.

With reference to the first aspect, in a second possible implementation, the determining second feature extraction parameters based on the first feature extraction parameters includes: reading a first quantization parameter from the target memory, where the first quantization parameter is a quantization parameter used for performing the first quantization processing on the network parameters; and dequantizing the first feature extraction parameters based on the first quantization parameter to obtain the second feature extraction parameters.

In addition, the determining second to-be-extracted feature data based on the first to-be-extracted feature data includes: reading a second quantization parameter from the target memory, where the second quantization parameter is a quantization parameter used for performing the second quantization processing on the initial to-be-extracted feature data; and dequantizing the first to-be-extracted feature data based on the second quantization parameter to obtain the second to-be-extracted feature data.

In other words, in this implementation, the quantization parameter used for performing quantization processing on the network parameters and the quantization parameter used for performing quantization processing on the initial to-be-extracted feature data are separately obtained based on respective cases.

In this case, after the quantized first feature extraction parameters and the quantized first to-be-extracted feature data are read from the target memory, dequantization is separately performed based on a respective quantization parameter, and the addition convolution operation is performed on the dequantized second feature extraction parameters and the dequantized second to-be-extracted feature data.

In this implementation, because feature extraction is performed based on the dequantized second feature extraction parameters and the dequantized second to-be-extracted feature data, precision of an extracted feature can be improved.

In addition, the second feature extraction parameters and the second to-be-extracted feature data are obtained through quantization by using the quantization parameters respectively corresponding to the second feature extraction parameters and the second to-be-extracted feature data. Compared with that the second feature extraction parameters and the second to-be-extracted feature data are obtained through quantization by using a same quantization parameter, precision is higher, thereby further extracting a more precise target feature.

With reference to the first aspect or any one of the foregoing possible implementations, in a third possible implementation, the target processor includes an operation circuit, the operation circuit includes a first subcircuit and a second subcircuit, the first subcircuit includes M*N operation units, and the M*N operation units are separately in a one-to-one correspondence with the M*N parameters and the M*N pieces of data; each of the M*N operation units is configured to compute an absolute value of a difference between a corresponding parameter and corresponding data; and the second subcircuit is configured to compute and output a sum of absolute values output by all the M*N operation units, and the sum is used to obtain feature data of a target feature in to-be-extracted feature data, wherein, to-be-extracted feature data is the second to-be-extracted feature data.

That is, the addition convolution operation is implemented by using hardware. This can improve an operation speed compared with implementing the addition convolution operation by using a software module.

With reference to the third possible implementation, in a fourth possible implementation, each operation unit includes a first input port, a second input port, an adder, a comparator, a selector, and an output port.

For each operation unit, the first input port is configured to input a corresponding parameter, and the second input port is configured to input corresponding data; the adder is configured to compute and output a first difference obtained by subtracting the corresponding data from the corresponding parameter and a second difference obtained by subtracting the corresponding parameter from the corresponding data; the comparator is configured to compare a size of the corresponding parameter with a size of the corresponding data, output a first comparison result when the corresponding parameter is greater than the corresponding data, and output a second comparison result when the corresponding data is greater than or equal to the corresponding parameter; the selector is configured to output the first difference when the first comparison result is input, and output the second difference when the second comparison result is input; and the output port is configured to output an output of the selector.

In this implementation, the addition convolution operation is implemented by using the adder, the selector, and the comparator, thereby further improving an operation rate.

With reference to the fourth possible implementation, in a fifth possible implementation, the target processor further includes a first memory, a second memory, and a controller that are connected to the operation circuit.

The first memory is configured to store a parameter matrix; and the second memory is configured to store a data matrix.

The controller is configured to execute instructions, so that the corresponding parameter is input into the first input port of each operation unit, the corresponding data is input into the second input port of each operation unit, the adder of each operation unit computes the first difference and the second difference, the comparator of each operation unit compares first data with a first parameter and outputs the first comparison result or the second comparison result, the selector of each operation unit outputs the first difference when the comparator of each operation unit outputs the first comparison result, and outputs the second difference when the comparator of each operation unit outputs the second comparison result, and the second subcircuit computes and outputs a sum of differences output by all operation units in M operation groups.

In this implementation, the target processor includes the memories and the controller. In addition, under control of the controller, a parameter and data are directly read from the memory, and the addition convolution operation is performed based on the parameter and the data. Compared with reading a parameter and data from an external memory of the target processor and performing an operation under control of external instructions, the operation speed can be improved.

According to a second aspect, this application provides a processor. The processor includes an operation circuit, the operation circuit includes a first subcircuit and a second subcircuit, the first subcircuit includes M*N operation units, and M and N are positive integers.

Each of the M*N operation units is configured to compute an absolute value of a difference between a target parameter input into each operation unit and target data input into each operation unit.

The second subcircuit is configured to compute and output a sum of absolute values output by all the M*N operation units.

The processor proposed in this application may be configured to perform addition convolution computation on a feature extraction parameter and to-be-extracted feature data of a neural network, thereby saving a computing resource required for implementing feature extraction, and further reducing a limitation on an application of neural network-based artificial intelligence to a resource-limited device.

With reference to the second aspect, in a first possible implementation, each operation unit includes a first input port, a second input port, an adder, a comparator, a selector, and an output port.

For each operation unit, the first input port is configured to input the corresponding parameter, and the second input port is configured to input the corresponding data; the adder is configured to compute and output a first difference obtained by subtracting the corresponding data from the corresponding parameter and a second difference obtained by subtracting the corresponding parameter from the corresponding data; the comparator is configured to compare a size of the corresponding parameter with a size of the corresponding data, output a first comparison result when the corresponding parameter is greater than the corresponding data, and output a second comparison result when the corresponding data is greater than or equal to the corresponding parameter; the selector is configured to output the first difference when the first comparison result is input, and output the second difference when the second comparison result is input; and the output port is configured to output an output of the selector.

In this implementation, an addition convolution operation is implemented by using the adder, the selector, and the comparator, thereby further improving an operation rate.

The target parameter may be the second feature extraction parameter in the first aspect, the target data may be the second to-be-extracted feature data in the first aspect, and the processor may be the target processor in the first aspect.

With reference to the first possible implementation, in a second possible implementation, the processor further includes a first memory, a second memory, and a controller that are connected to the operation circuit.

The first memory is configured to store the target parameter; and the second memory is configured to store the target data.

The controller is configured to execute instructions, so that the corresponding parameter is input into the first input port of each operation unit, the corresponding data is input into the second input port of each operation unit, the adder of each operation unit computes the first difference and the second difference, the comparator of each operation unit compares first data with a first parameter and outputs the first comparison result or the second comparison result, the selector of each operation unit outputs the first difference when the comparator of each operation unit outputs the first comparison result, and outputs the second difference when the comparator of each operation unit outputs the second comparison result, and the second subcircuit computes and outputs a sum of differences output by all operation units in M operation groups.

In this implementation, the processor includes the memories and the controller. In addition, under control of the controller, a parameter and data are directly read from the memory, and the addition convolution operation is performed based on the parameter and the data. Compared with reading a parameter and data from an external memory of the processor and performing an operation under control of external instructions, an operation speed can be improved.

According to a third aspect, a data feature extraction apparatus is provided. The apparatus includes modules configured to perform the method in the first aspect or any implementation of the first aspect. Optionally, these modules may be implemented in a software or hardware manner.

According to a fourth aspect, a data feature extraction apparatus is provided. The apparatus includes: a memory, configured to store a program; and a processor, configured to execute the program stored in the memory, and when the program stored in the memory is executed, the processor is configured to perform the method in the first aspect or any implementation of the first aspect.

According to a fifth aspect, a computer-readable medium is provided. The computer-readable medium stores program code executable by a device, where the program code is used to perform the method in the first aspect or any implementation of the first aspect.

According to a sixth aspect, a chip is provided. The chip includes a processor and a data interface, where the processor reads, through the data interface, instructions stored in a memory to perform the method in the first aspect or any implementation of the first aspect.

Optionally, in an implementation, the chip may further include a memory, where the memory stores instructions, the processor is configured to execute the instructions stored in the memory, and when the instructions are executed, the processor is configured to perform the method in the first aspect or any implementation of the first aspect.

For example, the chip may be an AI chip. For another example, the chip may be a neural network accelerator.

According to a seventh aspect, a computing device is provided. The computing device includes: a memory, configured to store a program; and a processor, configured to execute the program stored in the memory, and when the program stored in the memory is executed, the processor is configured to perform the method in the first aspect or any implementation of the first aspect.

BRIEF DESCRIPTION OF DRAWINGS

FIG. 2 is an example diagram of quantization processing according to an embodiment of this application;

DESCRIPTION OF EMBODIMENTS

Figure 1:
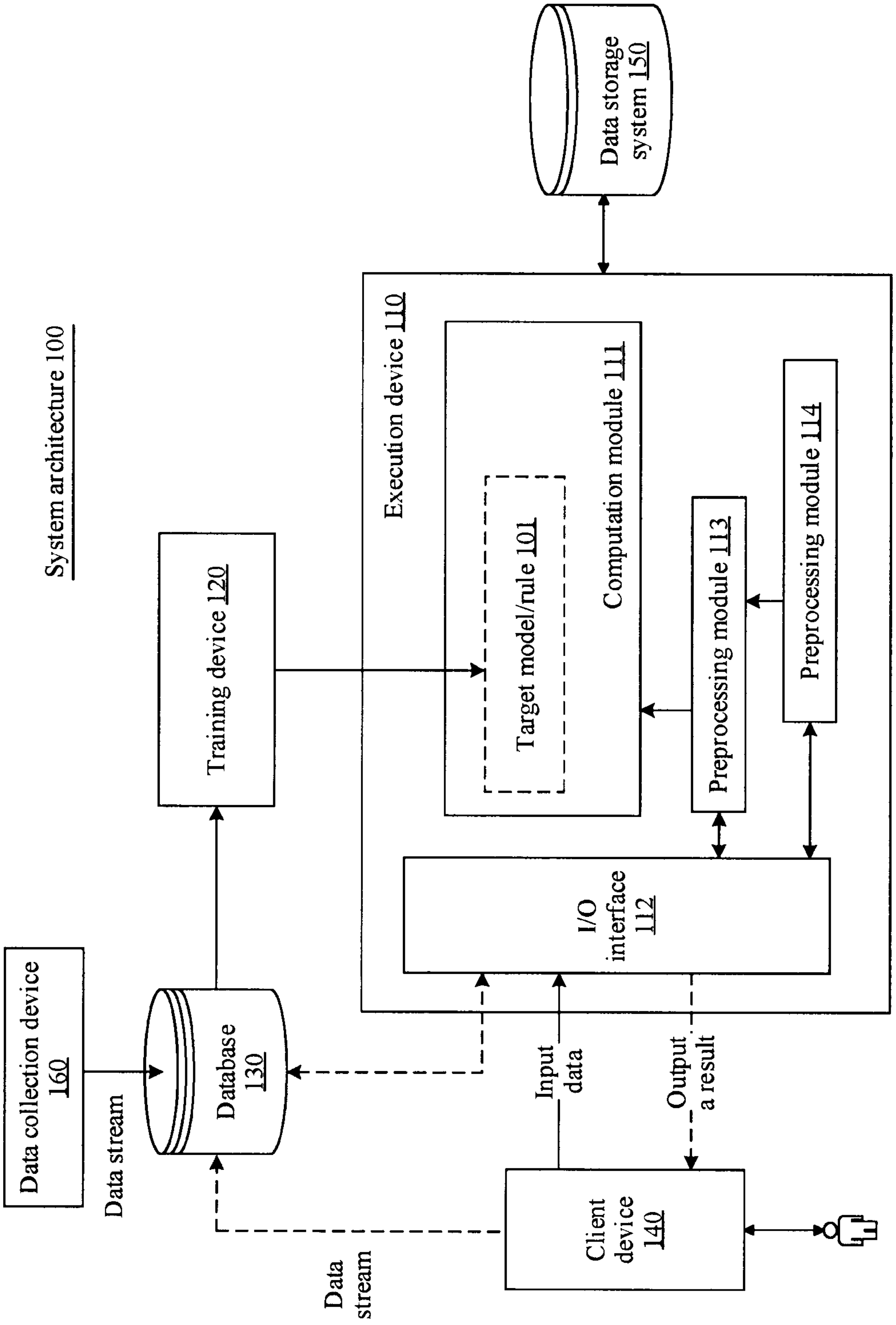
FIG. 1 is a diagram of an example structure of a system architecture according to an embodiment of this application.

The following describes the technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of the present invention without creative efforts shall fall within the protection scope of this application.

The method and the apparatus provided in embodiments of this application can be applied to picture retrieval, album management, safe city, man-machine interaction, and another scenario in which image processing (for example, image classification or image recognition) needs to be performed. It may be understood that an image in embodiments of this application may be a static image (or referred to as a static picture) or a dynamic image (or referred to as a dynamic picture). For example, an image in this application may be a video or a dynamic picture, or may be a static picture or photo. For ease of description, the static image or the dynamic image is collectively referred to as an image in the following embodiments of this application.

Example application scenarios of the method and the apparatus in embodiments of this application are album classification and shooting identification. The following describes the two scenarios.

Album Classification:

A user stores a large quantity of pictures on a mobile phone. Classification management is performed for an album based on a category, and this can improve user experience. By using the method and the apparatus in embodiments of this application, pictures in the album are classified, thereby lowering a requirement of album classification for a storage resource and a computing resource of the mobile phone. In this way, album classification can also be implemented on a resource-limited mobile phone. In addition, when the pictures in the album are classified by using the method and the apparatus in embodiments of this application, computational complexity is low, and a management time of the user can be further saved, thereby improving efficiency of album management.

For example, when album classification is performed by using the method and the apparatus in embodiments of this application, a picture feature of a picture in the album may be extracted by using the method and the apparatus provided in this application, and then the picture in the album is classified based on the extracted picture feature to obtain a classification result of the picture, to obtain an album arranged based on a picture category.

Shooting Identification:

When performing shooting, a user may process a shot photo by using the method and the apparatus in embodiments of this application, to automatically identify a category of a photographed object. For example, the photographed object may be automatically identified as a flower or an animal. The method and the apparatus in embodiments of this application may be used to identify the photographed object to identify the category to which the object belongs. For example, the photo shot by the user includes a shared bike, a feature of the shared bike can be extracted by using the method and the apparatus in embodiments of this application, and then the object is identified as a bike.

It should be understood that album classification and shooting identification described above are merely two example application scenarios of the method and the apparatus in embodiments of this application, and the method and the apparatus in embodiments of this application are not limited to the foregoing two scenarios. The method and the apparatus in embodiments of this application can be applied to any scenario in which feature extraction needs to be performed, for example, facial recognition. Alternatively, the method and the apparatus in embodiments of this application may be similarly applied to another field in which feature extraction needs to be performed, for example, voice recognition, machine translation, and semantic segmentation.

Embodiments of this application relate to related applications of a large quantity of neural networks. To better understand solutions of embodiments of this application, the following first describes related terms and concepts of neural networks that may be in embodiments of this application.

(1) Neural Network

A neural network may include a neural unit. The neural unit may be an operation unit that uses $x_s$ and an intercept 1 as inputs. An output of the operation unit may be shown in Formula (1-1):

$$h_{W,b}(x) = f(W^T x) = f\left(\sum_{s=1}^{n} W_s x_s + b\right) \quad (1\text{-}1)$$

s=1, 2, . . . , or n, n is a natural number greater than 1, $W_s$ is a weight of $x_s$, and b is a bias of the neural unit. f is an activation function of the neural unit, and is used to introduce a nonlinear feature into the neural network, to convert an input signal in the neural unit into an output signal. The output signal of the activation function may be used as an input of a next convolutional layer, and the activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

A deep neural network (DNN), also referred to as a multi-layer neural network, may be understood as a neural network having a plurality of hidden layers. The DNN is divided based on locations of different layers, so that the neural network in the DNN can be divided into three types: an input layer, hidden layers, and an output layer. Generally, the first layer is the input layer, the last layer is the output layer, and the middle layer is the hidden layer. Layers are fully connected. That is, any neuron at an $i^{th}$ layer needs to be connected to any neuron at an $(i+1)^{th}$ layer.

Although it seems that the DNN is complex, working of each layer is not complex, and is as the following linear relational expression in brief: $\vec{y}=\alpha(W\cdot\vec{x}+\vec{b})$, where $\vec{x}$ is an input vector, $\vec{y}$ is an output vector, $\vec{b}$ is an offset vector, W is a weight matrix (also referred to as coefficients), and $\alpha()$ is an activation function. At each layer, the output vector $\vec{y}$ is obtained by performing such a simple operation on the input vector $\vec{x}$. Because the DNN has a plurality of layers, a quantity of coefficients W and a quantity of offset vectors $\vec{b}$ are also large. Definitions of these parameters in the DNN are as follows: The coefficient W is used as an example. It is assumed that in a three-layer DNN, a linear coefficient from the fourth neuron at the second layer to the second neuron at the third layer is defined as $$W_{24}^{3}.$$

The superscript 3 represents a layer at which the coefficient w is located, and the subscript corresponds to an output third-layer index 2 and an input second-layer index 4.

In conclusion, coefficients of a $k^{th}$ neuron at an $(L-1)^{th}$ layer to a $j^{th}$ neuron at an $L^{th}$ layer are defined as $$W_{jk}^{L}.$$

It should be noted that the input layer does not have the parameters W. In the deep neural network, more hidden layers make the network more capable of describing a complex case in the real world. In theory, a model with more parameters has higher complexity and a larger "capacity", which means that the model can complete a more complex learning task. Training the deep neural network is a process of learning a weight matrix, and a final objective of the training is to obtain a weight matrix of all layers of the trained deep neural network (a weight matrix formed by vectors w at many layers).

(3) Convolutional Neural Network

A convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer that is in the convolutional neural network and at which convolution processing is performed on an input signal. One neuron at the convolutional layer of the convolutional neural network may be connected to only some neurons at an adjacent layer. One convolutional layer usually includes several feature planes, and each feature plane may include some neural units that are in a rectangular arrangement. Neural units at a same feature plane share a weight, and the weight shared herein is a convolution kernel. Image processing is used as an example. Weight sharing may be understood as that a manner of extracting image information is independent of a location. The convolution kernel may be initialized in a form of a matrix of a random size. In a training process of the convolutional neural network, the convolution kernel may obtain a reasonable weight through learning. In addition, benefits directly brought by weight sharing are that connections among layers of the convolutional neural network are reduced, and an overfitting risk is reduced.

(4) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

A neural network may correct a size of a parameter in an initial neural network model in a training process by using an error back propagation (BP) algorithm, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is a back propagation movement dominated by an error loss, and is intended to obtain an optimal parameter of the neural network model, for example, a weight matrix.

(6) Pixel Value

A pixel value of an image may be a red-green-blue (RGB) color value, and the pixel value may be a long integer representing a color. For example, a pixel value is 256*Red+100*Green+76*Blue, where Blue represents a blue component, Green represents a green component, and Red represents a red component. In each color component, a smaller value indicates lower brightness, and a larger value indicates higher brightness. A pixel value of a grayscale image may be a grayscale value.

FIG. 1 is a diagram of an example structure of a system architecture 100 according to an embodiment of this application. In FIG. 1, a data collection device 160 is configured to collect training data. For example, the system architecture is configured to perform image processing. Then the training data may include a training image and a classification result corresponding to the training image, where the classification result of the training image may be a result obtained through manual pre-annotation.

After the training data is collected, the data collection device 160 stores the training data in a database 130. A training device 120 obtains a target model 101 through training based on the training data maintained in the database 130. The target model in this application may alternatively be replaced with a target rule.

The following describes a process in which the training device 120 obtains the target model 101 based on the training data. For example, the system architecture is configured to perform image processing. The training device 120 processes an input original image, compares an output image with the original image, and adjusts a parameter of the target model 101 based on a comparison result, until a difference between the image output by the training device 120 and the original image is less than a specific threshold, thereby completing training of the target model 101.

It may be understood that, in an actual application, not all the training data maintained in the database 130 needs to be collected by the data collection device 160, but the training data may alternatively be received from another device. In addition, the training device 120 does not need to train the target model 101 completely based on the training data maintained in the database 130, but may alternatively perform model training by obtaining training data from a cloud or another place. The foregoing descriptions should not be considered as a limitation on this embodiment of this application.

The target model 101 obtained through training by the training device 120 may be applied to different systems or devices, for example, applied to an execution device 110 shown in FIG. 1. The execution device 110 may be a terminal, for example, a mobile phone terminal, a tablet computer, a notebook computer, augmented reality (AR)/virtual reality (VR), or a vehicle-mounted terminal, or may be a resource-limited server, a resource-limited cloud device, or the like.

In FIG. 1, the execution device 110 is configured with an input/output (I/O) interface 112, configured to perform data interaction with an external device, and a user can input data into the I/O interface 112 by using a client device 140. For example, the system architecture is configured to perform image processing. Then the input data may include a to-be-processed image input by the client device.

A preprocessing module 113 and a preprocessing module 114 are configured to perform preprocessing based on the input data (for example, the to-be-processed image) received by the I/O interface 112. In this embodiment of this application, there may be no preprocessing module 113 and no preprocessing module 114 (or there may be only one of the preprocessing modules), and a computation module 111 is directly used to process the input data.

In a process in which the execution device 110 preprocesses the input data, or in a process in which the computation module 111 of the execution device 110 performs related processing such as computation, the execution device 110 may invoke data, code, and the like in a data storage system 150 to perform corresponding processing, or may store data, instructions, and the like that are obtained through corresponding processing in the data storage system 150.

Finally, the I/O interface 112 returns a processing result, for example, a classification result of the to-be-processed image in image classification, to the client device 140, to provide the processing result to the user.

It should be noted that the training device 120 may generate corresponding target models 101 based on different training data for different targets or tasks. The corresponding target models 101 may be used to implement the targets or complete the tasks, thereby providing a required result for the user.

In the case shown in FIG. 1, the user may manually give the input data, where the manual giving may be operated in an interface provided by the I/O interface 112. In another case, the client device 140 may automatically send the input data to the I/O interface 112. If an authorization of the user is required for the client device 140 to automatically send the input data, the user can set a corresponding permission in the client device 140. The user can view, on the client device 140, a result output by the execution device 110. The result may be specifically presented in a specific manner, for example, display, sound, or an action. The client device 140 may alternatively be used as a data collection terminal, to collect the input data input into the I/O interface 112 and the output result output by the I/O interface 112 that are shown in the figure as new sample data, and store the new sample data in the database 130. Certainly, the input data input into the I/O interface 112 and the output result output by the I/O interface 112 that are shown in the figure may not be collected by the client device 140, but be directly used by the I/O interface 112 as new sample data to be stored in the database 130.

It may be understood that FIG. 1 is merely a schematic diagram of a system architecture according to an embodiment of this application. A location relationship among a device, a component, a module, and the like shown in the figure is not limited. For example, in FIG. 1, the data storage system 150 is an external memory relative to the execution device 110, and in another case, the data storage system 150 may alternatively be disposed in the execution device 110.

In the system architecture shown in FIG. 1, after the target model 101 is trained by the training device 120 and before the target model 101 is applied to a corresponding system or device, parameters in the target model further need to be quantized.

For example, when the parameters in the target model are stored in a 32-bit floating-point data format (FP32), these parameters may be quantized into a numerical format, for example, a 16-bit floating-point data format (FP16), a 16-bit fixed-point integer data format (INT16), an 8-bit fixed-point integer data format (INT8), a 4-bit fixed-point integer data format (INT4), a 2-bit fixed-point integer data format, or a 1-bit fixed-point integer data format. 32-bit, 16-bit, . . . , and 1-bit in this embodiment of this application each may be understood as a corresponding quantity of bits.

An example quantization manner includes: finding a weight parameter with a maximum absolute value from weight parameters of a specified layer of the target model, and denoting the maximum weight parameter as $\max(|X_f|)$; determining a target bit quantity n obtained after the weight parameters of the specified layer are quantized and a value representation range of the bit quantity n, where the value representation range may be denoted as $[-2^{n-1}, 2^{n-1}-1]$, for example, a value range represented by an 8-bit fixed-point integer is [−128,127]; determining a quantization parameter scale, or referred to as a quantization coefficient or a scaling coefficient, where an example computation manner of the quantization parameter is $\text{scale}=(2^{n-1}-1)/\max(|X_f|)$; and multiplying all the weight parameters of the specified layer by the quantization parameter scale, and then taking approximate integers to obtain quantized weight parameters. The specified layer may be one layer in the target model, for example, a convolutional layer, or may be a plurality of layers or all layers in the target model.

The following describes, with reference to FIG. 2, a quantization manner in this embodiment of this application by using an example in which weight parameters in the 32-bit floating-point data format are quantized into weight parameters in the 2-bit fixed-point integer data format.

As shown in FIG. 2, a left figure shows a weight matrix with four rows and four columns, and each weight coefficient in the weight matrix is in the 32-bit floating-point numerical format. A maximum weight parameter in the weight matrix is 2.12 in the second row and the fourth column, that is, $\max(|X_f|)=2.12$. A value range of a 2-bit fixed-point integer is [−2,1]. That is, scale=1/2.12. In this way, each weight parameter in the left figure is multiplied by scale=1/2.12, and an approximate integer is taken. In this way, a quantized weight matrix in a right figure can be obtained.

It may be understood that the foregoing quantization manner is merely an example. In this embodiment of this application, a quantization manner of the weight parameters of the target model is not limited. For example, the maximum weight parameter may be divided by $(2^{n-1}-1)$ to obtain the quantization parameter, and then the weight parameters of the specified layer are divided by the quantization parameter to obtain the quantized weight parameters.

In this embodiment of this application, after the training device sends the quantized weight parameters to the execution device, compared with the weight parameters before quantization, the execution device may store the weight parameters by using fewer storage resources. Compared with storing the weight parameters in the 32-bit floating-point numerical format before quantization, the execution device requires fewer storage resources to store the weight parameters in the 8-bit fixed-point integer numerical format after quantization.

In this embodiment of this application, the training device may send both the quantized weight parameters and the quantization parameter to the execution device. In this way, after the execution device stores the quantized weight parameters and when feature extraction is performed based on the weight parameters, in some implementations, the weight parameters may be first dequantized based on the quantization parameter, and then based on dequantized weight parameters, feature extraction is performed on the data input by the user; and in some other implementations, based on the quantization parameter, feature extraction may be first performed on the data input by the user, and then extracted feature data is dequantized based on the quantization parameter. In this embodiment of this application, dequantization processing is performed, to improve precision of finally obtained feature data.

In this embodiment of this application, after receiving the data input by the user, the execution device may quantize the data, and store quantized data. Image classification is used as an example. After the user inputs an image, the execution device, for example, the preprocessing module in the execution device, may perform quantization processing on the image, and store quantized image data, so that the computation module classifies the image based on the quantized image data. An implementation of quantization processing of the data input by the user is similar to the quantization manner of the weight parameters. Details are not described herein again. In this implementation, before performing feature extraction on the quantized data based on the quantized weight parameters, the execution device may separately dequantize the weight parameters and the data first, and then perform feature extraction on dequantized data based on dequantized weight parameters.

Dequantization processing performed on the weight parameters and the data may also be understood as quantization processing, but a quantization parameter used for the quantization processing is a reciprocal of the foregoing quantization parameter.

Figure 8:
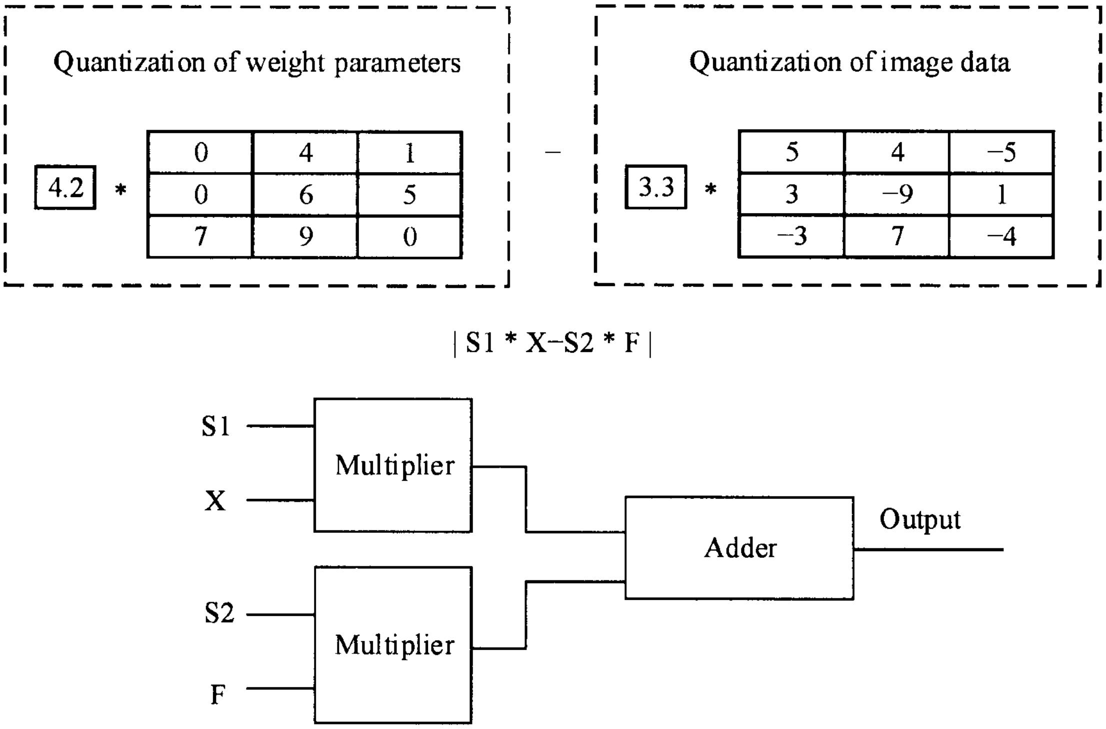
FIG. 8 is an example diagram of a data feature extraction method according to an embodiment of this application.

An example of this implementation is shown in FIG. 8. S1 represents the quantization parameter of the weight parameters, S2 represents a quantization parameter of an image input, X represents a weight matrix, and F represents an image matrix. This implementation may be referred to as a discrete addition quantization technology.

In some other implementations of this embodiment of this application, when quantizing the weight parameters, the training device may obtain one quantization parameter of the weight parameters based on the foregoing method, determine the quantization parameter of the input data based on other historical input data of the execution device with reference to the foregoing quantization parameter obtaining method, and then determine a final quantization parameter of the weight parameters based on the two quantization parameters. For example, a maximum quantization parameter in the two quantization parameters is determined as the final quantization parameter. After the final quantization parameter is obtained, the training device may quantize the weight parameters based on the final quantization parameter, and send quantized weight parameters and the final quantization parameter to the execution device. The execution device stores the weight parameters and the quantization parameter, and may quantize the input data based on the quantization parameter when the user inputs the data, perform feature extraction on quantized data based on the weight parameters, and dequantize extracted feature data based on the quantization parameter, to obtain final feature data. In this implementation, the weight parameters and the input data share a same quantization parameter. Therefore, dequantization processing is performed only once during dequantization. In this way, precision of the final feature data can be improved with low computational complexity and less computing resources.

Dequantization processing performed on the weight parameters and the data may also be understood as quantization processing, but a quantization parameter used for the quantization processing is a reciprocal of the foregoing quantization parameter.

Figure 9:
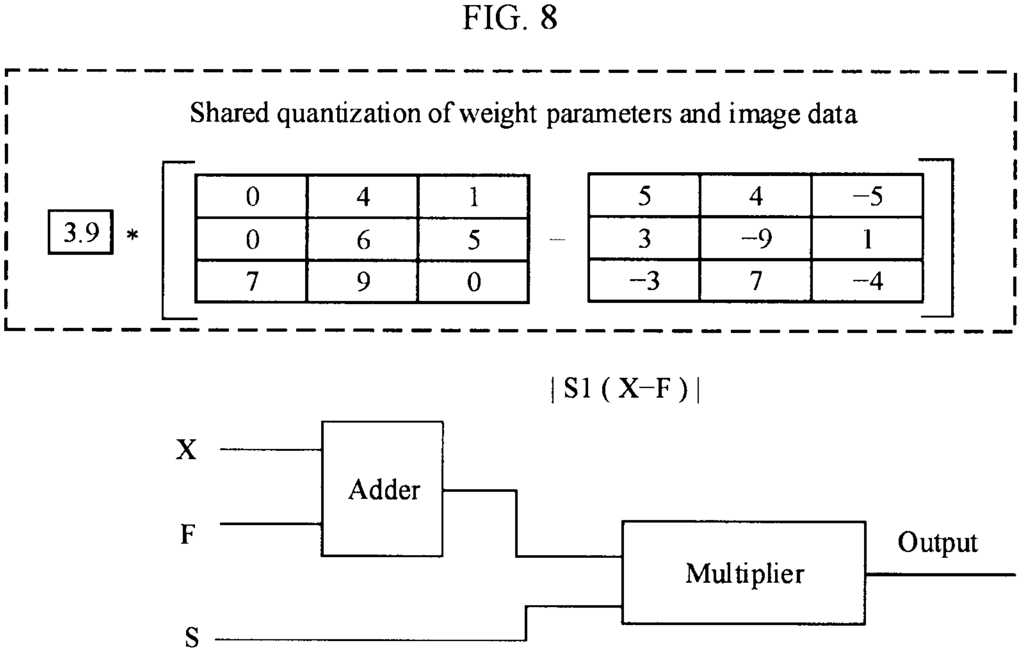
FIG. 9 is an example diagram of a data feature extraction method according to another embodiment of this application.

An example of this implementation is shown in FIG. 9. S represents the shared quantization parameter, X represents a weight matrix, and F represents an image matrix. This implementation may be referred to as a shared quantization technology.

In the system architecture shown in FIG. 1, the target model 101 obtained through training by the training device 120 may be a neural network, for example, may be a CNN or a deep convolutional neural network (DCNN).

Figure 3:
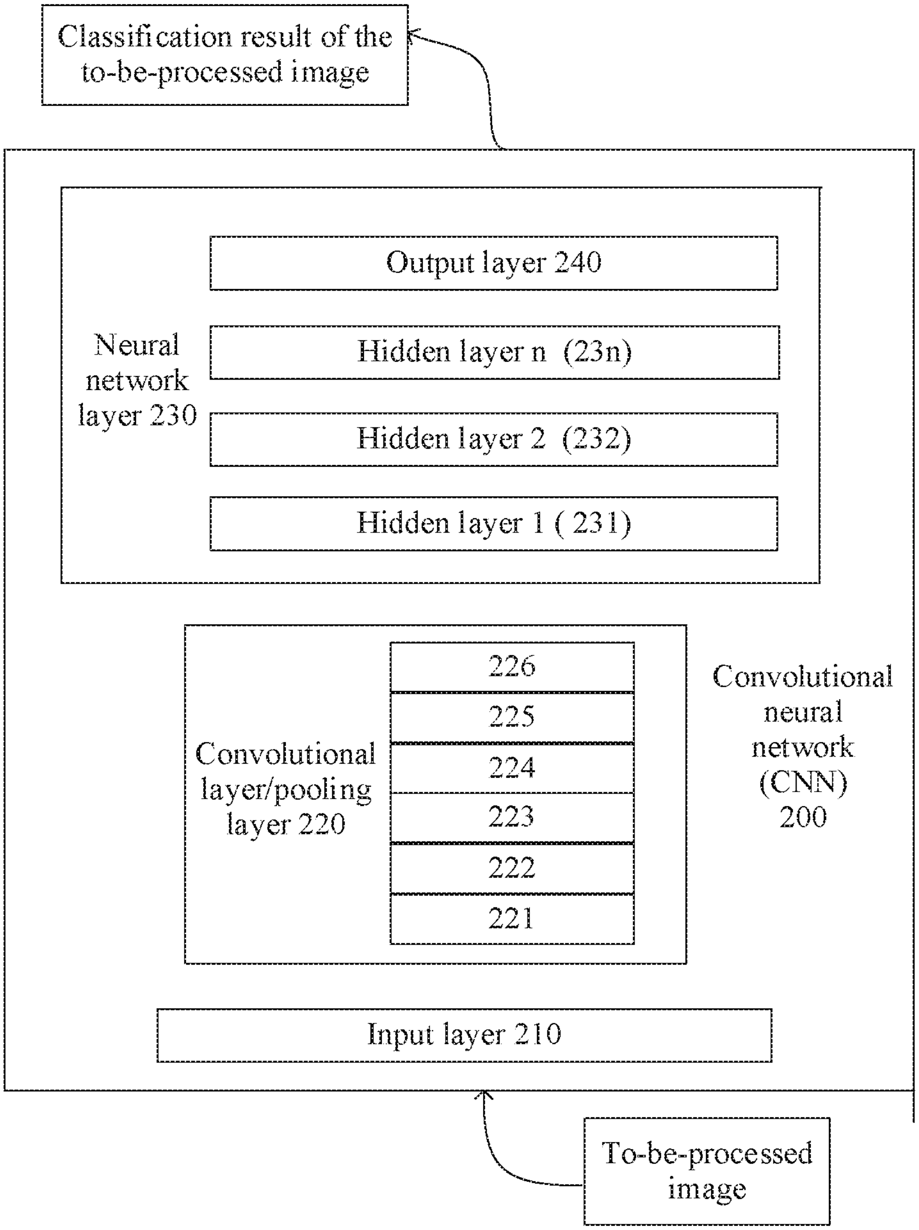
FIG. 3 is a diagram of an example structure of a convolutional neural network according to an embodiment of this application.

The following describes, with reference to FIG. 3, a structure of a neural network in this embodiment of this application by using a CNN as an example. As described in the foregoing basic concept descriptions, the convolutional neural network is a deep neural network with a convolutional structure, and is a deep learning architecture. The deep learning architecture refers to multi-level learning performed at different abstract levels by using a machine learning algorithm. As a deep learning architecture, the CNN is a feed-forward artificial neural network, and each neuron in the feed-forward artificial neural network may respond to an image input into the feed-forward artificial neural network.

As shown in FIG. 3, the convolutional neural network (CNN) 300 may include an input layer 310, a convolutional layer/pooling layer 320 (where the pooling layer is optional), and a neural network layer 330. The following describes related content of these layers in detail.

Convolutional Layer/Pooling Layer 320:

Convolutional Layer:

As shown in FIG. 3, the convolutional layer/pooling layer 320 may include example layers 321 to 326. For example, in an implementation, the layer 321 is a convolutional layer, the layer 322 is a pooling layer, the layer 323 is a convolutional layer, the layer 324 is a pooling layer, the layer 325 is a convolutional layer, and the layer 326 is a pooling layer. In another implementation, the layers 321 and 322 are convolutional layers, the layer 323 is a pooling layer, the layers 324 and 325 are convolutional layers, and the layer 326 is a pooling layer. That is, an output of a convolutional layer may be used as an input of a subsequent pooling layer, or may be used as an input of another convolutional layer to continue a convolution operation.

The following describes an internal operating principle of a convolutional layer by using the convolutional layer 321 as an example.

The convolutional layer 321 may include a plurality of convolution operators, and the convolution operators are also referred to as kernels. In corresponding data processing, the convolution operator is equivalent to a filter that extracts specific information from input data. The convolution operators may essentially be a weight matrix. The weight matrix is usually predefined, and is updated in a training process.

Image classification is used as an example. A function of the convolution operator in image classification is equivalent to a filter that extracts specific image information from an input image matrix. In a process of performing a convolution operation on an image, pixels on an input image are usually processed one by one (or two by two, which depends on a value of a stride) along a horizontal direction based on the weight matrix, to extract a specific feature from the image. A size of the weight matrix should be related to a size of the picture. It should be noted that a depth dimension of the weight matrix is the same as a depth dimension of the input picture. During a convolution operation, the weight matrix extends to an entire depth of the input picture. Therefore, a convolution output of a single depth dimension is generated through convolution based on a single weight matrix. However, the single weight matrix is not used in most cases, but a plurality of weight matrices of a same size (rows*columns), namely, a plurality of homotype matrices, are applied. Outputs of the weight matrices are stacked to form a depth dimension of a convolutional picture. The dimension herein may be understood as being determined based on the foregoing "plurality". Different weight matrices may be used to extract different features in an image. For example, one weight matrix is used to extract edge information of the image, another weight matrix is used to extract a specific color of the image, and still another weight matrix is used to blur unwanted noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a large amount of training in an actual application. Each weight matrix formed by the weight values obtained through training may be used to extract specific information from input information, so that the convolutional neural network 300 performs correct prediction.

When the convolutional neural network 300 has a plurality of convolutional layers, a relatively large quantity of general features are usually extracted at an initial convolutional layer (for example, 321). The general feature may also be referred to as a low-level feature. As a depth of the convolutional neural network 300 increases, a feature extracted at a subsequent convolutional layer (for example, 326) is more complex, for example, a high-level semantic feature. A feature with higher-level semantics is more applicable to a to-be-resolved problem.

Convolutional Layer/Pooling Layer 320:

A quantity of training parameters often needs to be reduced. Therefore, a pooling layer often needs to be periodically introduced after a convolutional layer. In the example layers 321 to 326 shown in 320 in FIG. 3, one convolutional layer may be followed by one pooling layer, or a plurality of convolutional layers may be followed by one or more pooling layers. Image classification is used as an example. An only objective of the pooling layer is to reduce a space size of an image. The pooling layer may include an average pooling operator and/or a maximum pooling operator, to perform sampling on the input picture to obtain a picture with a relatively small size. The average pooling operator may compute pixel values in the image in a specific range, to generate an average value as a result of average pooling. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each pixel in the picture output from the pooling layer represents an average value or a maximum value of a corresponding sub-region of the picture input to the pooling layer.

Neural Network Layer 330:

After processing is performed by the convolutional layer/pooling layer 320, the convolutional neural network 300 still cannot output required output information. As described above, the convolutional layer/pooling layer 320 performs only feature extraction and reduces the parameters brought by the input data. However, to generate final output information (required class information or other related information), the convolutional neural network 300 needs to use the neural network layer 330 to generate outputs of one or a group of required classes. Therefore, the neural network layer 330 may include a plurality of hidden layers (for example, 331, 332, . . . , and 33*n* shown in FIG. 3) and an output layer 340. Parameters included in the plurality of hidden layers may be obtained through pre-training based on training data related to a specific task type. For example, the task type may include image recognition, image classification, or image super-resolution reconstruction.

A last layer of the entire convolutional neural network 300, that is, after the plurality of hidden layers in the neural network layer 330, is the output layer 340. The output layer 340 has a loss function similar to a classification cross entropy, which is specifically used to compute a prediction error. Once forward propagation of the entire convolutional neural network 300 (as shown in FIG. 3, propagation in a direction from 310 to 340 is forward propagation) is completed, the weight values and an error of each layer mentioned above are updated through backward propagation (as shown in FIG. 3, propagation in a direction from 340 to 310 is backward propagation), to reduce a loss of the convolutional neural network 300 and an error between a result output by the convolutional neural network 300 by using the output layer and an ideal result.

In the conventional technology, when feature extraction is performed by using a convolutional layer, a multiplication convolution operation is used. The following describes, with reference to FIG. 4, an implementation of multiplication convolution in the conventional technology by using image processing as an example.

Figure 4:
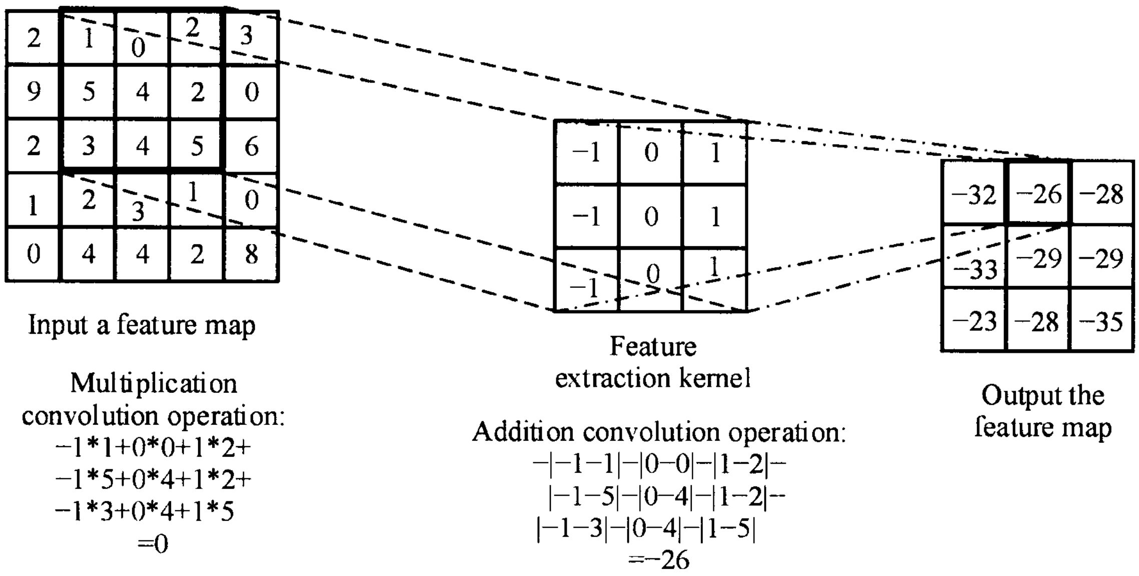
FIG. 4 is an example diagram of a multiplication convolution operation and an addition convolution operation according to an embodiment of this application.

As shown in FIG. 4, when one weight matrix of the convolutional layer is a matrix with three rows and three columns, and a pixel matrix obtained after one dimension of an input image is quantized is a matrix with five rows and five columns, the multiplication convolution operation is performed on a corresponding pixel in the pixel matrix based on the weight matrix to obtain a corresponding output pixel 0. The multiplication convolution operation includes nine multiplication operations, and a large quantity of computing resources are required for the multiplication operations. Therefore, specific feature extraction performed based on the multiplication convolution operation has a high resource requirement for the execution device. This limits an application of feature extraction-based artificial intelligence to the resource-limited execution device.

To resolve the foregoing problem, an addition convolution operation is proposed in this embodiment of this application, that is, a specific feature can be extracted from the input data based on the convolution kernel without using a multiplication or division operation. In the addition convolution operation provided in this application, a Manhattan distance, or referred to as an L1 regular distance, between each parameter in the convolution kernel and corresponding data in the input data is first computed, and a sum of Manhattan distances corresponding to all data in the convolution kernel window is computed to obtain feature data in the convolution kernel window.

For example, in an example implementation of the addition convolution operation in this application, an absolute value of a difference between each parameter in the convolution kernel and corresponding data in the input data may be computed, an opposite number of a sum of these absolute values is computed, and finally, the opposite number is used as one piece of feature data obtained through extraction.

FIG. 4 is used as an example. The feature data computed through the addition convolution operation is −26. The addition convolution operation does not include a multiplication or division operation, and includes only addition and subtraction in four hybrid arithmetic operations, thereby lowering a computing resource requirement, and facilitating an application of artificial intelligence to a resource-limited device.

It should be noted that a convolutional neural network 400 shown in FIG. 4 is merely an example of a convolutional neural network. In a specific application, the convolutional neural network may alternatively exist in a form of another network model.

Figure 5:
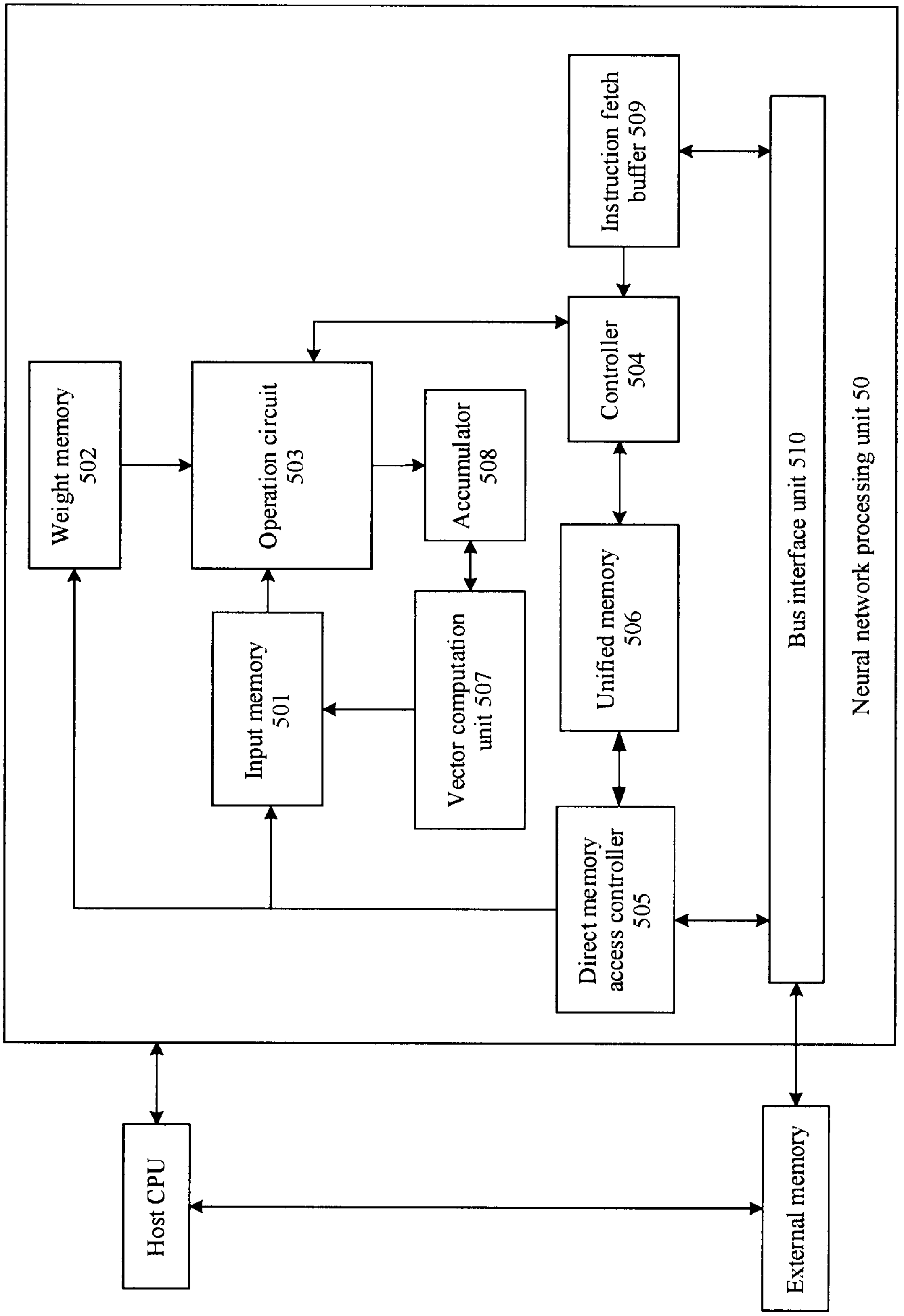
FIG. 5 is an example diagram of a hardware structure of a chip according to an embodiment of this application.

FIG. 5 shows a hardware structure of a chip according to an embodiment of this application. The chip may be referred to as an AI chip. The chip includes a neural network processing unit (NPU) 50, and the neural network processing unit 50 may also be referred to as a neural network accelerator.

The chip shown in FIG. 5 may be disposed in the execution device 110 shown in FIG. 1, to complete a computation work of the computation module 111. The chip may alternatively be disposed in the training device 120 shown in FIG. 1, to complete a training work of the training device 120 and output the target model 101. An algorithm of each layer in the convolutional neural network shown in FIG. 3 may be implemented in the chip shown in FIG. 5, for example, computation of the convolutional layer may be implemented in an operation circuit 503.

The neural network processing unit NPU 50 is mounted to a host CPU as a coprocessor, and a task is allocated by the host CPU. A core part of the NPU is the operation circuit 503, and a controller 504 controls the operation circuit 503 to extract data from a memory (a weight memory or an input memory) and perform an operation.

In some implementations, the operation circuit 503 includes a plurality of process engines (PE). In some implementations, the operation circuit 503 is a two-dimensional systolic array. The operation circuit 503 may alternatively be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit 503 fetches data corresponding to the matrix B from the weight memory 502, and buffers the data on each PE in the operation circuit 503. The operation circuit 503 fetches data corresponding to the matrix A from the input memory 501, performs a matrix operation on the data corresponding to the matrix A and the data corresponding to the matrix B to obtain a part of result or a final result of the matrices, and stores the part of result or final result in an accumulator 508.

A vector computation unit 507 may further process an output of the operation circuit 503, for example, perform vector multiplication, vector addition, an exponent operation, a logarithm operation, or size comparison. For example, the vector computation unit 507 may be configured to perform network computation on a non-convolutional/non-FC layer in a neural network, for example, perform pooling, batch normalization, or local response normalization.

In some implementations, the vector computation unit 507 can store a processed output vector in a unified buffer 506. For example, the vector computation unit 507 may apply a non-linear function to the output of the operation circuit 503, for example, a vector of an accumulated value, to generate an activation value. In some implementations, the vector computation unit 507 generates a normalized value, a combined value, or a normalized value and a combined value. In some implementations, the processed output vector can be used as an activation input of the operation circuit 503, for example, for use at a subsequent layer in the neural network.

The unified memory 506 is configured to store input data and output data.

The input data in an external memory is directly transferred to the input memory 501 and/or the unified memory 506 by using a direct memory access controller (DMAC) 505, weight data in the external memory is stored in the weight memory 502, and data in the unified memory 506 is stored in the external memory.

A bus interface unit (BIU) 510 is configured to implement interaction among the host CPU, the DMAC, and an instruction fetch buffer 509 through a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Usually, all the unified memory 506, the input memory 501, the weight memory 502, and the instruction fetch buffer 509 are on-chip memories, and the external memory is a memory outside the NPU. The external memory may be a double data rate synchronous dynamic random access memory (DDR SDRAM), a high bandwidth memory (HBM), or another readable and writable memory.

An operation of each layer in the convolutional neural network shown in FIG. 3 may be performed by the operation circuit 503 or the vector computation unit 307.

In the conventional technology, when feature extraction is performed through a multiplication convolution operation based on a convolution kernel, a plurality of multiplication computation units need to be deployed in the operation circuit 503, and each multiplication computation unit needs to include a plurality of multipliers. The following describes, by using a convolution kernel with five rows and five columns in an LeNet-5 convolutional neural network with reference to FIG. 6, a diagram of an example structure of an operation circuit configured to perform image feature extraction through a multiplication convolution operation.

Figure 6:
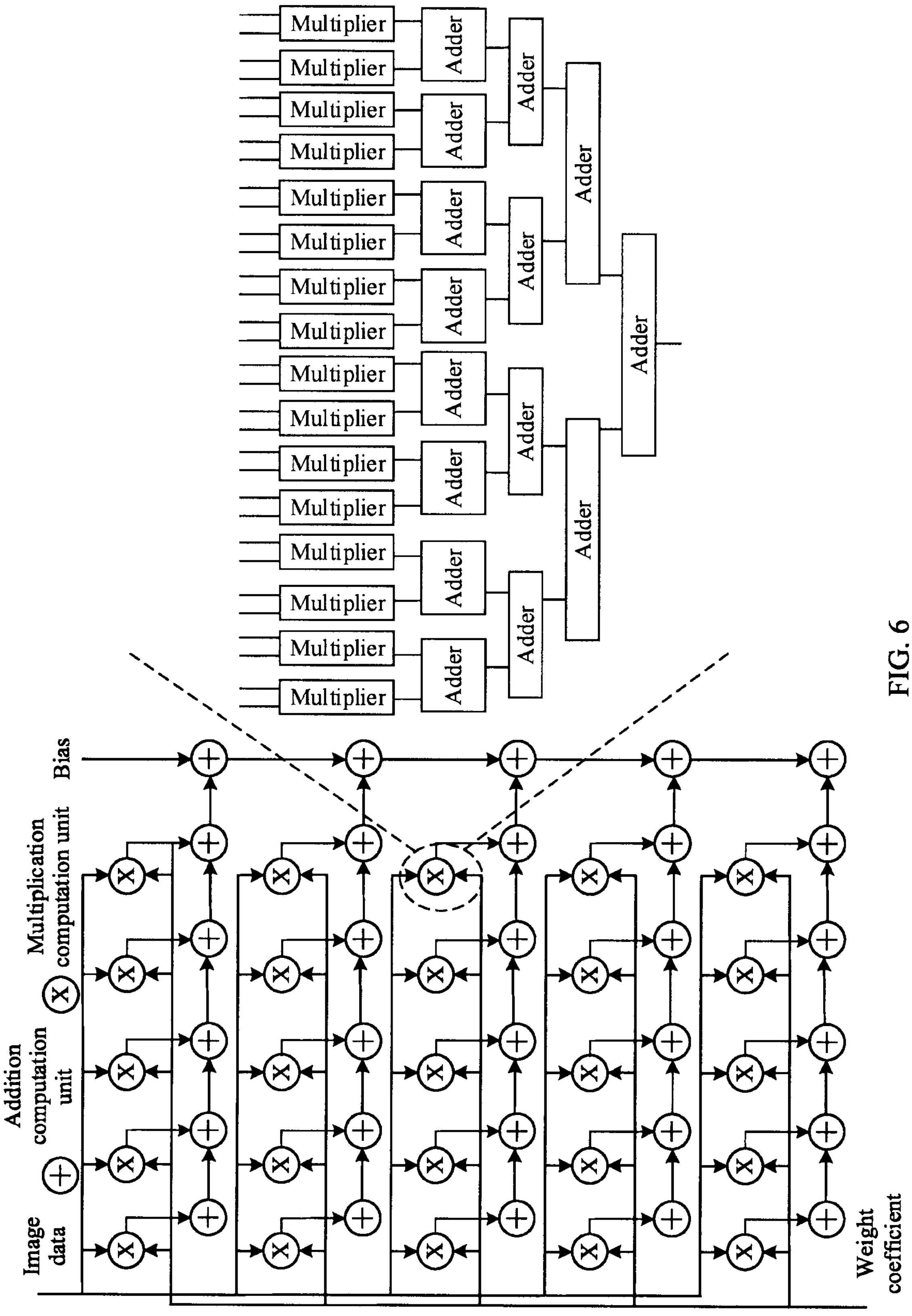
FIG. 6 is a diagram of an example structure of a multiplication convolution operation circuit according to an embodiment of this application.

As shown in FIG. 6, the operation circuit includes multiplication computation units of five rows and five columns and addition computation units of five rows and five columns. After being read from a buffer, image data and weight parameters in the convolution kernel are input into corresponding multiplication computation units, the multiplication computation units compute products of the input weight parameters and image data and input the products into corresponding addition computation units, and finally, a sum of all the products is computed to obtain a multiply-accumulate result. In this embodiment of this application, the operation circuit may also be referred to as a multiply-accumulate (MAC) unit.

Weight parameters and image data that are in a 16-bit floating-point numerical format are used as an example. Each multiplication computation unit includes at least 16 multipliers and 15 adders, to compute a product of one weight parameter in the 16-bit floating-point numerical format and one piece of image data in the 16-bit floating-point numerical format.

It can be learned from FIG. 6 that a hardware structure required for the multiplication convolution operation is complex, a large quantity of hardware resources are required, a computation time is also long, and energy consumption is large.

Based on the addition convolution operation mentioned in the foregoing embodiment of this application, this application proposes a new operation circuit. An example result of the operation circuit is shown in FIG. 7.

Figure 7:
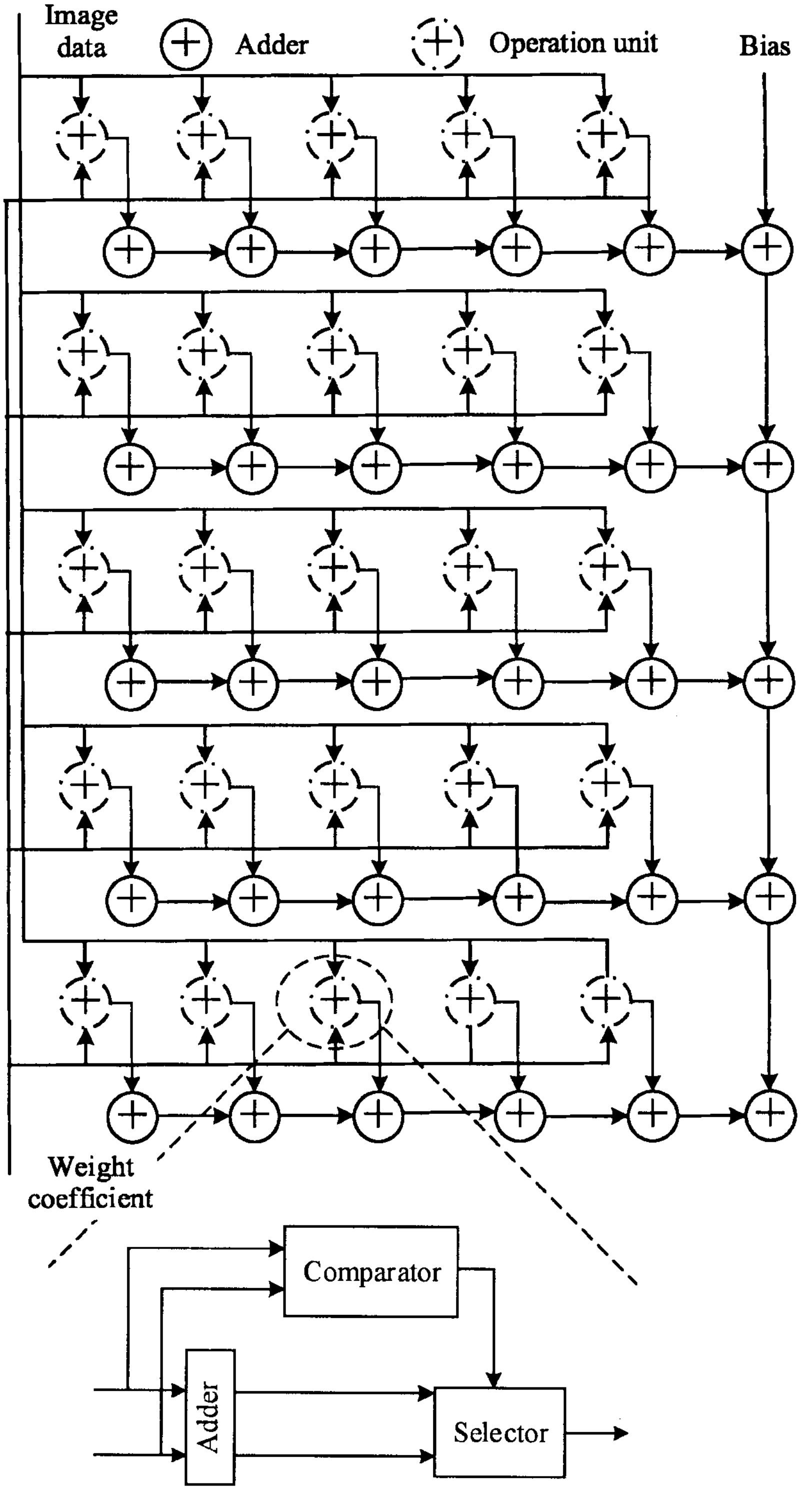
FIG. 7 is a diagram of an example structure of an addition convolution operation circuit according to an embodiment of this application.

The following describes, with reference to FIG. 7, the operation circuit of this application by using an example in which input data is an image. The operation circuit includes two subcircuits, where one subcircuit is referred to as a first subcircuit, and the other subcircuit is referred to as a second subcircuit. The first subcircuit includes operation units of five rows and five columns, and the second subcircuit includes adders of five rows and five columns. Each operation unit may include one adder, one comparator, and one selector, and each operation unit is configured to compute an absolute value of a difference between one weight parameter and one piece of image data.

Specifically, the adder is configured to: compute a difference by subtracting corresponding image data from an input weight parameter, where the difference is referred to as a first difference for ease of description; and compute a difference by subtracting the weight parameter from the image data, where the difference is referred to as a second difference for ease of description. The comparator is configured to compare a size of the weight parameter and a size of the image data, and output a first output result when the weight parameter is greater than the image data, or otherwise output a second output result. A result output by the comparator is input into the selector, when the comparator outputs the first output result, the selector outputs the first difference computed by the adder as an absolute value of the difference obtained by subtracting the image data from the weight parameter, and when the comparator outputs the second output result, the selector outputs the second difference computed by the adder as an absolute value of the difference obtained by subtracting the image data from the weight parameter.

It can be learned from FIG. 7 that, for a same weight parameter and a same input image, the operation circuit provided in this embodiment of this application can implement feature extraction by using only a small quantity of hardware resources, thereby facilitating an application of artificial intelligence to a resource-limited device.

Data in which weight parameters and an input image are in the 16-bit floating-point numerical format is used as an example. Hardware circuit resources required by the operation circuit of this embodiment of this application are only about one sixteenth of hardware circuit resources required by the operation circuit for the multiplication convolution operation.

The resource-limited device in this embodiment of this application may be a mobile phone, a tablet personal computer (TPC), a media player, a smart television, a laptop computer (LC), a personal digital assistant (PDA), a personal computer (PC), a camera, a video camera, a smartwatch, a wearable device (WD), an autonomous vehicle, or the like. This is not limited in this embodiment of this application.

Figure 10:
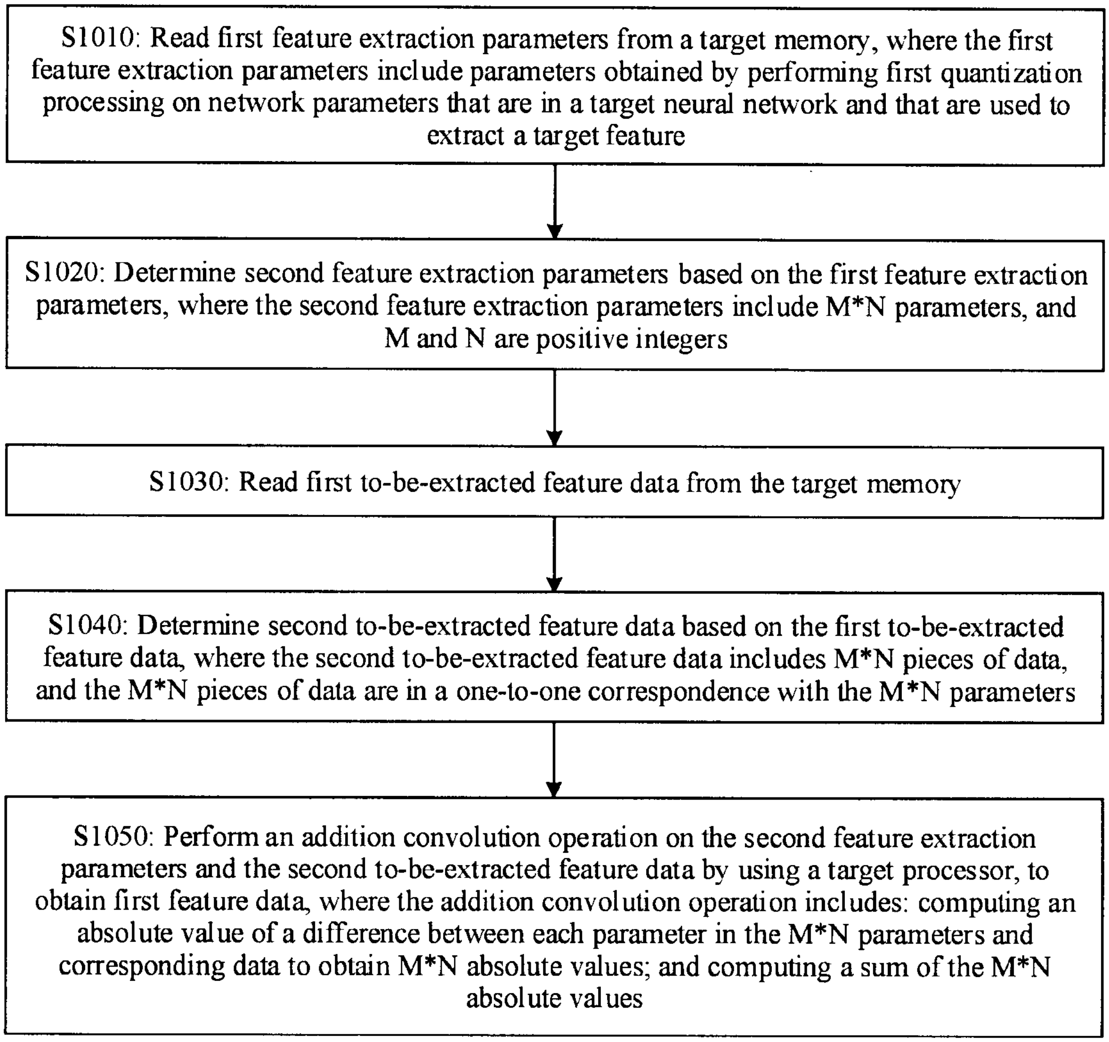
FIG. 10 is an example flowchart of a data feature extraction method according to still another embodiment of this application.

FIG. 10 is a schematic flowchart of a data feature extraction method according to an embodiment of this application. The method may be performed by an apparatus that can perform data feature extraction. For example, the method may be performed by the execution device in FIG. 1. For another example, the method may be performed by the chip in FIG. 5.

S1010: Read first feature extraction parameters from a target memory, where the first feature extraction parameters include parameters obtained by performing first quantization processing on network parameters that are in a target neural network and that are used to extract a target feature.

For example, when the method is performed by the execution device in FIG. 1, the target memory may be a memory in the execution device, or may be an external memory of the execution device. The target neural network may be the target model trained by the training device, for example, may be a convolutional neural network. One example of the network parameters is weight parameters of a convolutional layer.

For example, the target neural network is a neural network that is configured to perform image classification. Then the target feature may be an edge feature of an image or the like.

For another example, the target memory may be an external memory when the method is performed by the chip in FIG. 5.

S1020: Determine second feature extraction parameters based on the first feature extraction parameters, where the second feature extraction parameters include M*N parameters, and M and N are positive integers.

An example of determining the second feature extraction parameters based on the first feature extraction parameters is that the first feature extraction parameters are used as the second feature extraction parameters. Another example of determining the second feature extraction parameters based on the first feature extraction parameters is that the first feature extraction parameters are dequantized based on a quantization parameter used for the first quantization processing, and results obtained through dequantization are used as the second feature extraction parameters.

For example, this step may be implemented by the computation module of the execution device when the method is performed by the execution device in FIG. 1. For another example, this step may be implemented by the host CPU when the method is performed by the chip in FIG. 5.

S1030: Read first to-be-extracted feature data from the target memory.

The first to-be-extracted feature data may be data obtained after data input by a user is processed by another layer of the target neural network, or may be data obtained after data input by a user is processed and quantized by another layer of the target neural network. For ease of description, the quantization processing is referred to as second quantization processing.

In this embodiment of this application, the data obtained after the data input by the user is processed by the another layer of the target neural network may be referred to as initial to-be-extracted feature data. The data in this embodiment of this application may be data in a form of an image, a text, a language, or the like. An image is used as an example. The first to-be-extracted feature data may be a feature subimage of the image.

For example, this step may be implemented by the computation module of the execution device when the method is performed by the execution device in FIG. 1. For another example, this step may be implemented by the host CPU when the method is performed by the chip in FIG. 5.

S1040: Determine second to-be-extracted feature data based on the first to-be-extracted feature data, where the second to-be-extracted feature data includes M*N pieces of data, and the M*N pieces of data are in a one-to-one correspondence with the M*N parameters.

In an example, the first to-be-extracted feature data may be used as the second to-be-extracted feature data. In another example, data obtained by dequantizing the first to-be-extracted feature data may be used as the second to-be-extracted feature data.

For example, this step may be implemented by the preprocessing module of the execution device when the method is performed by the execution device in FIG. 1. For another example, this step may be implemented by the host CPU when the method is performed by the chip in FIG. 5.

S1050: Perform an addition convolution operation on the second feature extraction parameters and the second to-be-extracted feature data by using a target processor, to obtain first feature data, where the addition convolution operation includes: computing an absolute value of a difference between each parameter in the M*N parameters and corresponding data to obtain M*N absolute values; and computing a sum of the M*N absolute values.

For example, this step may be implemented by the computation module of the execution device when the method is performed by the execution device in FIG. 1. For another example, this step may be implemented by the neural network processing unit when the method is performed by the chip in FIG. 5. Further, this step may be implemented by the operation circuit 303. The second feature extraction parameters may be stored in the weight memory, and the second to-be-extracted feature data may be stored in the input memory.

In a possible implementation of this embodiment of this application, the first to-be-extracted feature data is data obtained by performing second quantization processing on the initial to-be-extracted feature data, a quantization parameter used for the second quantization processing may be a first quantization parameter, and the first quantization parameter is a quantization parameter used for performing the first quantization processing on the network parameters.

In this implementation, the determining second feature extraction parameters based on the first feature extraction parameters may include: determining the first feature extraction parameters as the second feature extraction parameters.

Correspondingly, the determining second to-be-extracted feature data based on the first to-be-extracted feature data may include: determining the first to-be-extracted feature data as the second to-be-extracted feature data.

In addition, the method may further include: performing dequantization processing on the first feature data based on the first quantization parameter to obtain second feature data.

In another possible implementation of this embodiment of this application, the first to-be-extracted feature data is data obtained by performing second quantization processing on the initial to-be-extracted feature data, and the determining second feature extraction parameters based on the first feature extraction parameters may include: reading a first quantization parameter from the target memory, where the first quantization parameter is a quantization parameter used for performing the first quantization processing on the network parameters; and dequantizing the first feature extraction parameters based on the first quantization parameter to obtain the second feature extraction parameters. In addition, the determining second to-be-extracted feature data based on the first to-be-extracted feature data may include: reading a second quantization parameter from the target memory, where the second quantization parameter is a quantization parameter used for performing the second quantization processing on the initial to-be-extracted feature data; and dequantizing the first to-be-extracted feature data based on the second quantization parameter to obtain the second to-be-extracted feature data.

In this embodiment of this application, the target processor includes an operation circuit, the operation circuit includes a first subcircuit and a second subcircuit, the first subcircuit includes M*N operation units, and the M*N operation units are separately in a one-to-one correspondence with the M*N parameters and the M*N pieces of data.

Each of the M*N operation units is configured to compute an absolute value of a difference between a corresponding parameter and corresponding data.

The second subcircuit is configured to compute and output a sum of absolute values output by all the M*N operation units, where the sum is used to obtain feature data of the target feature in the second to-be-extracted feature data.

Further, in an example, each operation unit includes a first input port, a second input port, an adder, a comparator, a selector, and an output port.

For each operation unit, the first input port is configured to input the corresponding parameter, and the second input port is configured to input the corresponding data; the adder is configured to compute and output a first difference obtained by subtracting the corresponding data from the corresponding parameter and a second difference obtained by subtracting the corresponding parameter from the corresponding data; the comparator is configured to compare a size of the corresponding parameter with a size of the corresponding data, output a first comparison result when the corresponding parameter is greater than the corresponding data, and output a second comparison result when the corresponding data is greater than or equal to the corresponding parameter; the selector is configured to output the first difference when the first comparison result is input, and output the second difference when the second comparison result is input; and the output port is configured to output an output of the selector.

An example of the operation circuit in this implementation is the operation circuit shown in FIG. 7.

In an example, the target processor in this embodiment of this application further includes a first memory, a second memory, and a controller that are connected to the operation circuit.

The first memory is configured to store a parameter matrix. The second memory is configured to store a data matrix. The controller is configured to execute instructions, so that the corresponding parameter is input into the first input port of each operation unit, the corresponding data is input into the second input port of each operation unit, the adder of each operation unit computes the first difference and the second difference, the comparator of each operation unit compares first data with a first parameter and outputs the first comparison result or the second comparison result, the selector of each operation unit outputs the first difference when the comparator of each operation unit outputs the first comparison result, and outputs the second difference when the comparator of each operation unit outputs the second comparison result, and the second subcircuit computes and outputs a sum of differences output by all operation units in M operation groups.

For example, the target processor is the neural network processing unit 50. An example of the first memory is the weight memory, an example of the second memory is the input memory, and an example of the controller is the controller 504.

In this embodiment of this application, compared with a technical solution in which quantization is not performed and feature extraction is performed through an addition convolution operation, in a technical solution in which a shared parameter is used to perform quantization of an 8-bit fixed-point integer data format on a weight parameter and input data and feature extraction is performed through an addition convolution operation, an output result can be lossless, that is, performance of this technical solution is almost the same as that of the technical solution in which quantization is not performed.

For example, ResNet-50 is used to perform image classification based on an ImageNet dataset. When quantization is not performed, Top1 accuracy is 74.9% and Top5 accuracy is 91.7% in a classification result. When a shared parameter quantization technology is used, Top1 accuracy is 74.4% and Top5 accuracy is 91.4% in a classification result. When a discrete quantization technology is used, Top1 accuracy is 74.9% and Top5 accuracy is 91.6%.

When feature extraction is performed through a conventional multiplication convolution operation, if a weight parameter is in a 32-bit floating-point numerical format, Top5 accuracy of a classification result of a neural network is 91.80%; if the weight parameter is quantized into an 8-bit fixed-point integer numerical format, the Top5 accuracy of the classification result of the neural network is 91.76%; and if the weight parameter is quantized into a 4-bit fixed-point integer numerical format, the Top5 accuracy of the classification result of the neural network is 89.54%.

When quantization is performed based on a shared quantization solution, and feature extraction is performed through an addition convolution operation, if a weight parameter and image data are quantized into an 8-bit fixed-point integer numerical format, Top5 accuracy of a classification result of a neural network is 91.78%; if the weight parameter and the image data are quantized into a 7-bit fixed-point integer numerical format, the Top5 accuracy of the classification result of the neural network is 91.68%; if the weight parameter and the image data are quantized into a 6-bit fixed-point integer numerical format, the Top5 accuracy of the classification result of the neural network is 91.60%; if the weight parameter and the image data are quantized into a 5-bit fixed-point integer numerical format, the Top5 accuracy of the classification result of the neural network is 91.20%; and if the weight parameter and the image data are quantized into a 4-bit fixed-point integer numerical format, the Top5 accuracy of the classification result of the neural network is 87.57%.

In this embodiment of this application, when feature extraction is performed by a neural network that uses the conventional multiplication convolution operation and a quantization technology, two 32-bit floating-point multipliers and one 8-bit integer multiplier are required, and energy consumption required for quantization of a single parameter is 7.6 petajoules (pJ).

When feature extraction is performed by a neural network that uses the discrete quantization technology and an addition convolution operation technology, two 32-bit floating-point multipliers and one 8-bit integer adder are required, and energy consumption required for quantization of a single parameter is 7.43 pJ.

When feature extraction is performed by a neural network that uses a shared quantization technology and an addition convolution operation technology, one 32-bit floating-point multiplier and one 32-bit floating-point adder are required, and energy consumption required for quantization of a single parameter is 4.6 pJ.

In this application, a development board of a series Zynq-7000 from a Xilinx Corporation is used as an example, to design and verify, when weight parameters of a classic convolutional network LeNet-5 are separately a 16-bit floating-point value and an 8-bit fixed-point integer value, power consumption required for performing image classification by running the network. When the weight parameters are separately a 16-bit floating-point value, energy consumption consumed by an addition convolution operation is 77.91% less than that consumed by a multiplication convolution operation. When the weight parameters are separately an 8-bit fixed-point integer value, energy consumption consumed by an addition convolution operation is 56.57% less than that consumed by a multiplication convolution operation.

In this application, the development board of the series Zynq-7000 from the Xilinx Corporation is used as an example, to design and verify circuit resources required for deployment of the classic convolutional network LeNet-5. When the network is deployed, a multiplication convolutional network and an addition convolutional network are separately established by using a same design architecture, where all of an input image, convolution kernel parameters, and an intermediate computation result are stored in a block RAM (BRAM). Integrated layout and wiring are not implemented by using an on-chip dedicated computation unit (digital signal processor, DSP) module, and a circuit implementation is completely performed by using on-chip logical resources, to implement fair comparison. A network that performs feature extraction through an addition convolution operation is referred to as an addition convolutional network, and a network that performs feature extraction through a multiplication convolution operation is referred to as a multiplication convolutional network.

It is verified that, in a same network structure, hardware resource consumption of an addition convolutional network in a 16-bit floating-point numerical format is 75.52% less than that of a multiplication convolutional network in the 16-bit floating-point numerical format, and hardware resource consumption of an addition convolutional network in an 8-bit fixed-point integer numerical format is 62.33% less than that of a multiplication convolutional network in the 8-bit fixed-point integer numerical format. That is, a circuit area is greatly reduced.

Figure 11:
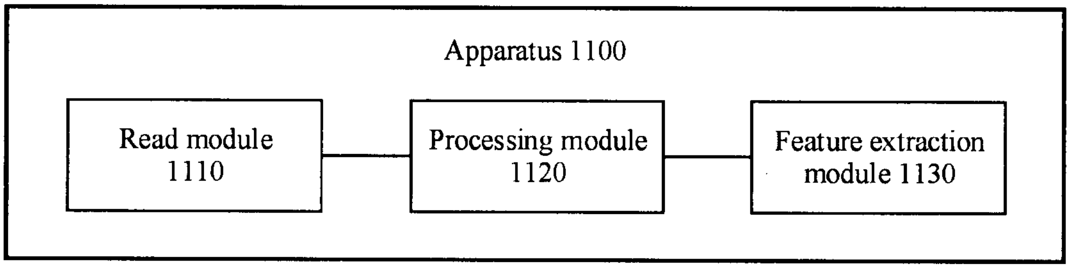
FIG. 11 is a diagram of an example structure of a data feature extraction apparatus according to an embodiment of this application.

FIG. 11 is a schematic diagram of a structure of a data feature extraction apparatus 1100 according to an embodiment of this application. The apparatus 1100 may include a read module 1110, a processing module 1120, and a feature extraction module 1130. The apparatus 1100 may be configured to implement the method shown in FIG. 10.

For example, the read module 1110 may be configured to perform S1010 and S1030, the processing module 1120 may be configured to perform S1020 and S1040, and the feature extraction module 1130 may be configured to perform S1050.

Figure 12:
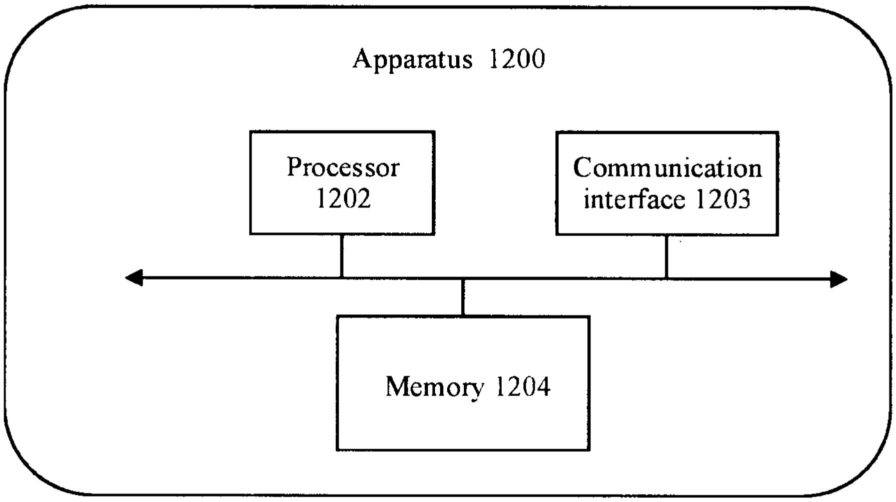
FIG. 12 is a diagram of an example structure of a data feature extraction apparatus according to another embodiment of this application.

FIG. 12 is a schematic diagram of a structure of an apparatus 1200 according to an embodiment of this application. The apparatus 1200 includes a processor 1202, a communication interface 1203, and a memory 1204. An example of the apparatus 1200 is a chip, and another example is a device.

The processor 1202, the memory 1204, and the communication interface 1203 may communicate with each other through a bus. The memory 1204 stores executable code, and the processor 1202 reads the executable code in the memory 1204 to perform a corresponding method. The memory 1204 may further include a software module required for another running process, for example, an operating system. The operating system may be LINUX™, UNIX™, WINDOWS™, or the like.

For example, the executable code in the memory 1204 is used to implement the method shown in FIG. 10, and the processor 1202 reads the executable code in the memory 1204 to perform the method shown in FIG. 10.

The processor 1202 may be a CPU. The memory 1204 may include a volatile memory, for example, a random access memory (RAM). The memory 1204 may alternatively include a non-volatile memory (NVM), for example, a read-only memory (ROM), a flash memory, a hard disk drive (HDD), or a solid state disk (SSD).

Figure 13:
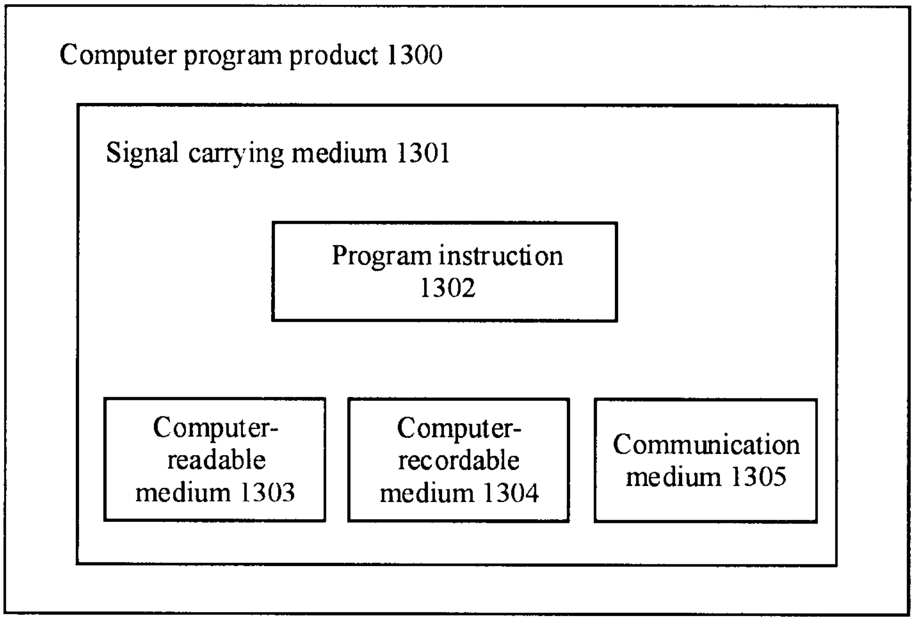
FIG. 13 is a diagram of example composition of a computer program product according to an embodiment of this application.

In some embodiments of this application, the disclosed method may be implemented as computer program instructions encoded on a computer-readable storage medium or encoded on another non-transitory medium or product in a machine-readable format. FIG. 13 is a schematic local concept view of an example computer program product arranged according to at least some embodiments shown herein. The example computer program product includes a computer program used to execute a computer process on a computing device. In an embodiment, the example computer program product 1300 is provided by using a signal carrying medium 1301. The signal carrying medium 1301 may include one or more program instructions 1302 that may provide the foregoing functions or some functions described for the method shown in FIG. 10 when being run by one or more processors. Therefore, for example, in the embodiment shown in FIG. 10, one or more features of S1010 to S1050 may be carried by one or more instructions associated with the signal carrying medium 1301.

In some examples, the signal carrying medium 1301 may include a computer-readable medium 1303, for example, a hard disk drive, a compact disk (CD), a digital video disc (DVD), a digital tape, a memory, a read-only memory (ROM), or a random access memory (RAM). In some implementations, the signal carrying medium 1301 may include a computer-recordable medium 1304, for example, a memory, a read/write (R/W) CD, or an R/W DVD. In some implementations, the signal carrying medium 1301 may include a communication medium 1305, for example, a digital and/or analog communication medium (for example, an optical fiber cable, a waveguide, a wired communication link, or a wireless communication link). Therefore, for example, the signal carrying medium 1301 may be delivered by using a communication medium 1305 in a wireless form (for example, a wireless communication medium complying with an IEEE 802.11 standard or another transmission protocol). The one or more program instructions 1302 may be, for example, computer-executable instructions or logic implementation instructions. In some examples, the computing device may be configured to provide various operations, functions, or actions in response to the program instructions 1302 that are delivered to the computing device by using one or more of the computer-readable mediums 1303, the computer-recordable medium 1304, and/or the communication medium 1305. It should be understood that the arrangement described herein is merely used as an example. Therefore, a person skilled in the art will understand that other arrangements and other elements (for example, a machine, an interface, a function, a sequence, and a function group) can be used instead, and some elements may be omitted based on a desired result. In addition, many of the elements described are functional entries that may be implemented as discrete or distributed components or implemented in combination with other components in any suitable combination and location.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data feature extraction method applied to a data feature extraction apparatus, the method comprising:

reading first feature extraction parameters from a target memory, wherein the first feature extraction parameters comprise parameters obtained by performing first quantization processing on network parameters, wherein the network parameters are in a target neural network and that are used to extract a target feature;

determining second feature extraction parameters based on the first feature extraction parameters, wherein the second feature extraction parameters comprise M*N parameters, and M and N are positive integers;

reading first to-be-extracted feature data from the target memory;

determining second to-be-extracted feature data based on the first to-be-extracted feature data, wherein the second to-be-extracted feature data comprises M*N pieces of data, and the M*N pieces of data are in a one-to-one correspondence with the M*N parameters; and performing an addition convolution operation on the second feature extraction parameters and the second to-be-extracted feature data by using a target processor, to obtain first feature data, wherein the addition convolution operation comprises: computing an absolute value of a difference between each of the M*N parameters and corresponding data to obtain M*N absolute values; and computing a sum of the M*N absolute values.

2. The method according to claim 1, wherein the first to-be-extracted feature data is data obtained by performing second quantization processing on initial to-be-extracted feature data, a quantization parameter used for the second quantization processing is a first quantization parameter, and the first quantization parameter is a quantization parameter used for performing the first quantization processing on the network parameters;

wherein the determining the second feature extraction parameters based on the first feature extraction parameters comprises: determining the first feature extraction parameters as the second feature extraction parameters;

wherein the determining the second to-be-extracted feature data based on the first to-be-extracted feature data comprises: determining the first to-be-extracted feature data as the second to-be-extracted feature data; and wherein the method further comprises:

performing dequantization processing on the first feature data based on the first quantization parameter to obtain second feature data.

3. The method according to claim 1, wherein the first to-be-extracted feature data is data obtained by performing second quantization processing on initial to-be-extracted feature data;

wherein the determining the second feature extraction parameters based on the first feature extraction parameters comprises:

reading a first quantization parameter from the target memory, wherein the first quantization parameter is a quantization parameter used for performing the first quantization processing on the network parameters, and dequantizing the first feature extraction parameters based on the first quantization parameter to obtain the second feature extraction parameters; and wherein the determining the second to-be-extracted feature data based on the first to-be-extracted feature data comprises:

reading a second quantization parameter from the target memory, wherein the second quantization parameter is a quantization parameter used for performing the second quantization processing on the initial to-be-extracted feature data, and dequantizing the first to-be-extracted feature data based on the second quantization parameter to obtain the second to-be-extracted feature data.

4. The method according to claim 1, wherein the target processor comprises an operation circuit, the operation circuit comprises a first subcircuit and a second subcircuit, the first subcircuit comprises M*N operation components, and the M*N operation components are separately in a one-to-one correspondence with the M*N parameters and the M*N pieces of data;

each of the M*N operation components is configured to compute an absolute value of a difference between a corresponding parameter and corresponding data; and the second subcircuit is configured to compute and output a sum of absolute values output by all the M*N operation components, wherein the sum is used to obtain feature data of a target feature in the second to-be-extracted feature data.

5. The method according to claim 4, wherein each operation component comprises a first input port, a second input port, an adder, a comparator, a selector, and an output port; and wherein for each operation component, the first input port is configured to input the corresponding parameter;

the second input port is configured to input the corresponding data;

the adder is configured to compute and output a first difference obtained by subtracting the corresponding data from the corresponding parameter and a second difference obtained by subtracting the corresponding parameter from the corresponding data;

the comparator is configured to compare a size of the corresponding parameter with a size of the corresponding data, output a first comparison result based on the corresponding parameter being greater than the corresponding data, and output a second comparison result based on the corresponding data being greater than or equal to the corresponding parameter;

the selector is configured to output the first difference based on the first comparison result being input, and output the second difference based on the second comparison result being input; and the output port is configured to output an output of the selector.

6. The method according to claim 5, wherein the target processor further comprises a first memory, a second memory, and a controller that are connected to the operation circuit;

the first memory is configured to store a parameter matrix;

the second memory is configured to store a data matrix;

the controller is configured to execute instructions, so that:

the corresponding parameter is input into the first input port of each operation component, the corresponding data is input into the second input port of each operation component, the adder of each operation component computes the first difference and the second difference, the comparator of each operation component compares the corresponding data with the corresponding parameter and outputs the first comparison result or the second comparison result, the selector of each operation component outputs the first difference based on the comparator of each operation component outputting the first comparison result, and outputs the second difference based on the comparator of each operation component outputting the second comparison result, and the second subcircuit computes and outputs a sum of differences output by all operation components in M operation groups.

7. A data feature extraction apparatus comprising:

a processor, coupled to a memory;

the memory, configured to store instructions; and wherein the processor is configured to execute the instructions stored in the memory, and the instructions upon execution cause the apparatus to implement the method according to claim 1.

8. A non-transitory computer-readable medium, comprising instructions, which upon execution by a processor, cause the processor to implement the method according to claim 1.

9. A processor of a data feature extraction apparatus, the processor comprising: an operation circuit, wherein the operation circuit includes a first subcircuit and a second subcircuit, the first subcircuit includes M*N operation components, and M and N are positive integers;

wherein the operation circuit is configured to determine second feature extraction parameters based on first feature extraction parameters, which are read by a reader of the data feature extraction apparatus from a target memory; wherein the second feature extraction parameters comprise M*N parameters;

wherein the operation circuit is further configured to determine second to-be-extracted feature data based on first to-be-extracted feature data, which is read by the reader from the target memory; wherein the second to-be-extracted feature data comprises M*N pieces of data, and the M*N pieces of data are in a one-to-one correspondence with the M*N parameters wherein the M*N operation components are separately in a one-to-one correspondence with the M*N parameters and the M*N pieces of data;

each of the M*N operation components is configured to compute an absolute value of a difference between a target parameter input into each operation component and target data input into each operation; and the second subcircuit is configured to compute and output a sum of absolute values output by all the M*N operation components; wherein the sum is used to obtain feature data of a target feature in the second to-be-extracted feature data.

10. The processor according to claim 9, wherein each operation component comprises a first input port, a second input port, an adder, a comparator, a selector, and an output port; and wherein for each operation component, the first input port is configured to input the target parameter, the second input port is configured to input the target data;

the adder is configured to compute and output a first difference obtained by subtracting the target data from the target parameter and a second difference obtained by subtracting the target parameter from the target data;

the comparator is configured to compare a size of the target parameter with a size of the target data, output a first comparison result based on the target parameter being greater than the target data, and output a second comparison result based on the target data being greater than or equal to the target parameter;

the selector is configured to output the first difference based on the first comparison result being input, and output the second difference based on the second comparison result being input; and the output port is configured to output an output of the selector.

11. The processor according to claim 10, further comprising:

a first memory, a second memory, and a controller that are connected to the operation circuit;

the first memory is configured to the target parameter;

the second memory is configured to store the target data;

the controller is configured to execute instructions, so that:

the target parameter is input into the first input port of each operation component, the target data is input into the second input port of each operation component, the adder of each operation component computes the first difference and the second difference, the comparator of each operation component compares the target data with the target parameter and outputs the first comparison result or the second comparison result, the selector of each operation component outputs the first difference based on the comparator of each operation component outputting the first comparison result, and outputs the second difference based on the comparator of each operation component outputting the second comparison result, and the second subcircuit computes and outputs a sum of differences output by all operation components in M operation groups.

12. A data feature extraction apparatus comprising:

a reader, configured to read first feature extraction parameters from a target memory, wherein the first feature extraction parameters comprise parameters obtained by performing first quantization processing on network parameters, wherein the network parameters are in a target neural network and that are used to extract a target feature;

a processor, configured to determine second feature extraction parameters based on the first feature extraction parameters, wherein the second feature extraction parameters comprise M*N parameters, and M and N are positive integers, wherein the reader is further configured to read first to-be-extracted feature data from the target memory, and the first to-be-extracted feature data is data obtained by performing second quantization processing on initial to-be-extracted feature data, and the processor is further configured to determine second to-be-extracted feature data based on the first to-be-extracted feature data, wherein the second to-be-extracted feature data comprises M*N pieces of data, and the M*N pieces of data are in a one-to-one correspondence with the M*N parameters; and a feature extractor, configured to perform an addition convolution operation on the second feature extraction parameters and the second to-be-extracted feature data by using a target processor, to obtain first feature data, wherein the addition convolution operation comprises: computing an absolute value of a difference between each of the M*N parameters and corresponding data to obtain M*N absolute values; and computing a sum of the M*N absolute values.

13. The apparatus according to claim 12, wherein a quantization parameter used for the second quantization processing is a first quantization parameter, and the first quantization parameter is a quantization parameter used for performing the first quantization processing on the network parameters;

the processor is configured to: determine the first feature extraction parameters as the second feature extraction parameters, and determine the first to-be-extracted feature data as the second to-be-extracted feature data; and the processor is further configured to:

perform dequantization processing on the first feature data based on the first quantization parameter to obtain second feature data.

14. The apparatus according to claim 12, wherein the processor is configured to:

read a first quantization parameter from the target memory, wherein the first quantization parameter is a quantization parameter used for performing the first quantization processing on the network parameters;

dequantize the first feature extraction parameters based on the first quantization parameter to obtain the second feature extraction parameters;

read a second quantization parameter from the target memory, wherein the second quantization parameter is a quantization parameter used for performing the second quantization processing on the initial to-be-extracted feature data; and dequantize the first to-be-extracted feature data based on the second quantization parameter to obtain the second to-be-extracted feature data.

15. The apparatus according to claim 12, wherein the target processor comprises an operation circuit, the operation circuit comprises a first subcircuit and a second subcircuit, the first subcircuit comprises M*N operation components, and the M*N operation components are separately in a one-to-one correspondence with the M*N parameters and the M*N pieces of data;

each of the M*N operation components is configured to compute an absolute value of a difference between a corresponding parameter and corresponding data; and the second subcircuit is configured to compute and output a sum of absolute values output by all the M*N operation components, wherein the sum is used to obtain feature data of a target feature in the second to-be-extracted feature data.

16. The apparatus according to claim 15, wherein each operation component comprises a first input port, a second input port, an adder, a comparator, a selector, and an output port; and wherein for each operation component, the first input port is configured to input the corresponding parameter, the second input port is configured to input the corresponding data;

the adder is configured to compute and output a first difference obtained by subtracting the corresponding data from the corresponding parameter and a second difference obtained by subtracting the corresponding parameter from the corresponding data;

the comparator is configured to compare a size of the corresponding parameter with a size of the corresponding data, output a first comparison result based on the corresponding parameter being greater than the corresponding data, and output a second comparison result based on the corresponding data being greater than or equal to the corresponding parameter;

the selector is configured to output the first difference based on the first comparison result being input, and output the second difference based on the second comparison result being input; and the output port is configured to output an output of the selector.

17. The apparatus according to claim 16, wherein the target processor further comprises a first memory, a second memory, and a controller that are connected to the operation circuit;

the first memory is configured to store a parameter matrix;

the second memory is configured to store a data matrix;

the controller is configured to execute instructions, so that:

the corresponding parameter is input into the first input port of each operation component, the corresponding data is input into the second input port of each operation component, the adder of each operation component computes the first difference and the second difference, the comparator of each operation component compares the corresponding data with the corresponding parameter and outputs the first comparison result or the second comparison result, the selector of each operation component outputs the first difference based on the comparator of each operation component outputs the first comparison result, and outputs the second difference based on the comparator of each operation component outputs the second comparison result, and the second subcircuit computes and outputs a sum of differences output by all operation components in M operation groups.

* * * * *